(12) United States Patent
Harada

(10) Patent No.: US 8,315,869 B2
(45) Date of Patent: Nov. 20, 2012

(54) SPEECH RECOGNITION APPARATUS, SPEECH RECOGNITION METHOD, AND RECORDING MEDIUM STORING SPEECH RECOGNITION PROGRAM

(75) Inventor: Shouji Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1277 days.

(21) Appl. No.: 11/488,644

(22) Filed: Jul. 19, 2006

(65) Prior Publication Data

US 2007/0233464 A1 Oct. 4, 2007

(30) Foreign Application Priority Data

Mar. 30, 2006 (JP) ................................. 2006-095287

(51) Int. Cl.
*G06F 17/20* (2006.01)
*G10L 15/04* (2006.01)
(52) U.S. Cl. ........................ 704/251; 704/10; 704/254
(58) Field of Classification Search .................. 704/10
See application file for complete search history.

(56) References Cited

U.S. PATENT DOCUMENTS

| | | | | | |
|---|---|---|---|---|---|
| 5,805,772 | A | * | 9/1998 | Chou et al. ..................... | 704/255 |
| 5,832,428 | A | * | 11/1998 | Chow et al. .................... | 704/254 |
| 5,835,890 | A | * | 11/1998 | Matsui et al. .................. | 704/255 |
| 6,324,509 | B1 | * | 11/2001 | Bi et al. .......................... | 704/248 |
| 6,801,891 | B2 | * | 10/2004 | Garner et al. .................. | 704/254 |
| 2002/0120448 | A1 | * | 8/2002 | Garner et al. .................. | 704/254 |
| 2003/0004722 | A1 | * | 1/2003 | Butzberger et al. ............ | 704/257 |
| 2003/0009335 | A1 | * | 1/2003 | Schalkwyk et al. ........... | 704/257 |
| 2003/0233235 | A1 | * | 12/2003 | Park ............................... | 704/257 |

(Continued)

FOREIGN PATENT DOCUMENTS

JP 58099828 A * 6/1983

(Continued)

OTHER PUBLICATIONS

Afify, Mohamed / Sarikaya, Ruhi / Kuo, Hong-Kwang Jeff / Besacier, Laurent / Gao, Yuqing (2006): "On the use of morphological analysis for dialectal Arabic speech recognition", In INTERSPEECH-2006, paper 1444-Mon2A2O.2.*

(Continued)

*Primary Examiner* — Richemond Dorvil
*Assistant Examiner* — Michael Ortiz Sanchez
(74) *Attorney, Agent, or Firm* — Kratz, Quintos & Hanson, LLP

(57) ABSTRACT

A speech recognition apparatus for recognizing a plurality of sequential words contained in a speech includes an acoustic model reading part for reading an acoustic model, a dictionary management part for reading required data from dictionary data, and a recognition part for successively recognizing the sequential words by matching a group of words represented by the dictionary data with the inputted speech, using the acoustic model, wherein the dictionary data contains a beginning part dictionary representing beginning parts of words, and a group of ending part dictionaries storing data representing ending parts, the ending part dictionary and/or the beginning part dictionary are read in accordance with the word recognized by the recognition part, and the recognition part matches a subsequent speech with the beginning parts of words contained in the beginning part dictionary while the dictionary management part is reading the ending part dictionary and/or the beginning part dictionary. Because of this, the speech recognition apparatus can delete a delay in speech recognition processing caused by the read of a word dictionary from an auxiliary storage in an apparatus having a constraint for a memory.

10 Claims, 10 Drawing Sheets

U.S. PATENT DOCUMENTS

| | | | |
|---|---|---|---|
| 2004/0107088 A1* | 6/2004 | Budzinski | 704/10 |
| 2004/0167779 A1* | 8/2004 | Lucke et al. | 704/240 |
| 2005/0091031 A1* | 4/2005 | Powell et al. | 704/4 |
| 2005/0187769 A1* | 8/2005 | Hwang et al. | 704/240 |
| 2007/0112553 A1* | 5/2007 | Jacobson | 704/2 |
| 2007/0233464 A1* | 10/2007 | Harada | 704/10 |

FOREIGN PATENT DOCUMENTS

| | | |
|---|---|---|
| JP | 1-260496 | 10/1989 |
| JP | 2-128286 | 5/1990 |
| JP | 10-49195 | 2/1998 |
| JP | 10-254479 | 9/1998 |
| JP | 2002-268673 | 9/2002 |

OTHER PUBLICATIONS

Kris Demuynck, Jacques Duchateau, Dirk Van Compernolle, Patrick Wambacq, An efficient search space representation for large vocabulary continuous speech recognition, Speech Communication, vol. 30, Issue 1, Jan. 2000, pp. 37-53, ISSN 0167-6393, DOI: 10.1016/S0167-6393(99)00030-8.*

Lamel, Lori / Adda, Gilles (1996): "On designing pronunciation lexicons for large vocabulary, continuous speech recognition", In ICSLP-1996, 6-9.*

Japanese Office Action dated Aug. 24, 2010 (in Japanese).

* cited by examiner

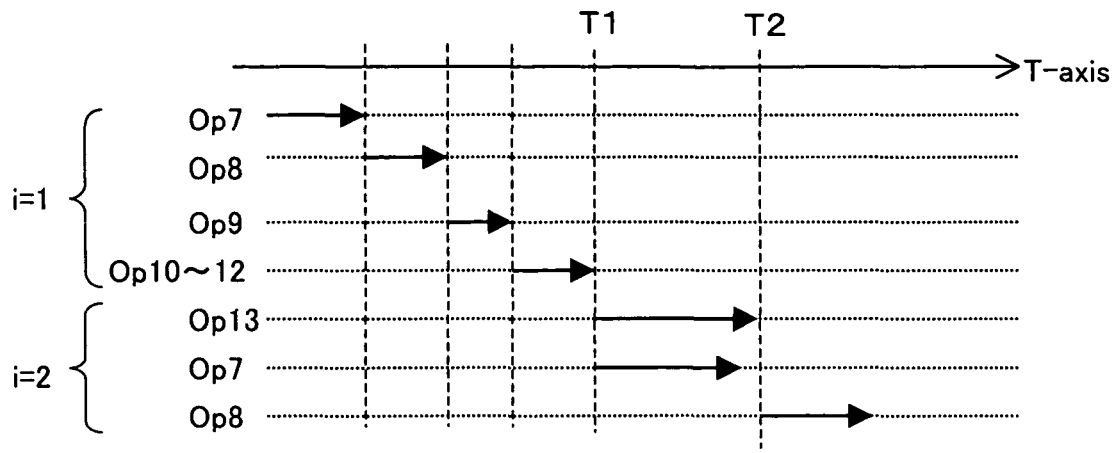
FIG.4
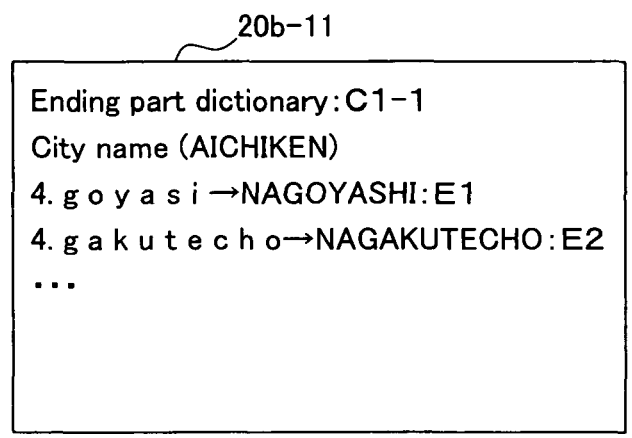
FIG.5
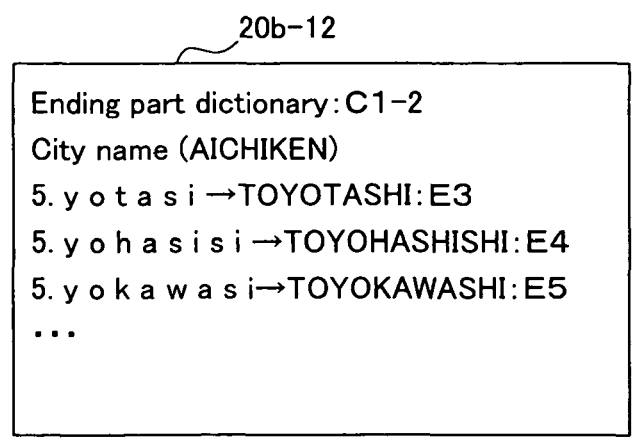

SPEECH RECOGNITION APPARATUS, SPEECH RECOGNITION METHOD, AND RECORDING MEDIUM STORING SPEECH RECOGNITION PROGRAM

BACKGROUND OF THE INVENTION

1. Field of the Invention

The present invention relates to a speech recognition apparatus, a speech recognition method, and a speech recognition program for recognizing sequential words uttered by a user.

2. Description of Related Art

A speech recognition apparatus is deployed in a main storage (main memory (hereinafter, referred to as a "memory"), in which a central processing unit (CPU) can directly read or write word dictionary data containing a great amount of words, so as to be used for speech recognition processing. In a conventional speech recognition apparatus, a word dictionary is divided into a plurality of files and recorded in an auxiliary storage such as an HDD, a DVD, or an ROM, and only a required file is read from the auxiliary storage to a memory for recognition processing. This can suppress the capacity of a memory to be used for speech recognition processing. However, while the word dictionary data is being read (loaded) from the auxiliary storage into the memory, recognition processing cannot proceed. This causes a delay in the speech recognition processing.

For example, in an address recognition apparatus, a prefecture name dictionary and a city name dictionary are recorded in an auxiliary storage respectively as files. When recognizing a speech in which a prefecture name and a city name are uttered sequentially (or example, "AICHIKEN, NAGOYASHI"), the address recognition apparatus recognizes a prefecture name "AICHIKEN", and then, reads a city name dictionary, corresponding to the prefecture name, to a memory. While reading the city name dictionary, the address recognition apparatus cannot proceed with recognition processing until the read is completed. Consequently, a delay is caused in address recognition processing.

A speech recognition apparatus that takes measures against such a delay has been proposed (see, for example, JP 2002-268673 A). The speech recognition apparatus performs matching processing using matching data read from a RAM in advance, while reading dictionary data from an auxiliary storage such as a DVD. The read dictionary data is recorded in delay matching data recording means, and the matching processing using data recorded in the delay matching data recording means is performed after the read is completed. After this, the delay matching data and the matching data are merged.

However, the above-mentioned speech recognition apparatus needs to merge results during matching with results obtained after the matching with a delay. Consequently, there has been a demand for a method for reducing a delay in processing caused by a waiting time for reading dictionary data from an auxiliary storage, by a method different from that of the above-mentioned speech recognition apparatus.

SUMMARY OF THE INVENTION

Therefore, with the foregoing in mind, it is an object of the present invention to provide a speech recognition apparatus, a speech recognition program, and a speech recognition method capable of reducing a delay in speech recognition processing caused by a waiting time for reading dictionary data from an auxiliary storage.

A speech recognition apparatus according to the present invention recognizes a plurality of sequentially associated words contained in an inputted speech, and outputs recognition results thereof. The speech recognition apparatus includes: an acoustic model reading part for reading an acoustic model previously recorded in an auxiliary storage into a main storage; a dictionary management part for reading dictionary data that includes a beginning part dictionary representing beginning parts of a group of words to be candidates of a word to be recognized, an ending part dictionary representing ending parts of the group of words, word order data representing a word order, and correspondence data representing a correspondence between the beginning part dictionary and the ending part dictionary from the auxiliary storage into the main storage; and a recognition part for successively recognizing the plurality of sequentially associated words contained in the inputted speech by matching the group of words represented by the beginning part dictionary and the ending part dictionary read into the main storage with the inputted speech, using the acoustic model and the correspondence data read into the main storage. The dictionary data contains at least one beginning part dictionary storing data representing a plurality of beginning parts of words, and a group of ending part dictionaries storing data representing a group of ending parts corresponding to a group of beginning parts represented by the beginning part dictionary as a plurality of ending part dictionaries. The dictionary management part reads the word order data and the beginning part dictionary containing beginning parts of a group of words to be candidates of at least one word among the words contained in the inputted speech into the main storage, and reads the ending part dictionary and/or the beginning part dictionary based on the word order data, while the recognition part is recognizing a word using the beginning part dictionary read into the main storage.

The auxiliary storage is a storage device with respect to which the acoustic model reading part, the dictionary management part, and the recognition part cannot read or write data at a high speed, and examples of the auxiliary storage include a hard disk, a DVD, an MO, a CD, a flexible disk, a magnetic tape, and a ROM. The auxiliary storage may also be called an external storage device.

An operation for the dictionary management part or the acoustic model reading part to read data refers to an operation of loading data recorded in the auxiliary storage into the main storage (main memory, which will be merely referred to as a "memory" hereinafter). The memory is a storage device with respect to which the acoustic model reading part, the dictionary management part, and the recognition part can read or write data directly and rapidly. As the memory, for example, a recording medium of recording data electrically using a semiconductor device is used. An example of the memory includes a RAM.

The beginning part dictionary contains data representing a plurality of beginning parts of words recorded so as to be organized logically. The ending part dictionary contains data representing a plurality of ending parts of words recorded so as to be organized logically. For example, one beginning part dictionary or one ending part dictionary may be composed of one file, or may be composed of one table in a database. Alternatively, for example, one file may contain a plurality of beginning part dictionaries or ending part dictionaries.

The dictionary management part reads the word order data and the beginning part dictionary containing beginning parts of a group of words to be candidates of at least one word among the words contained in the input speech into the memory. Therefore, the recognition part can match a portion corresponding to the beginning parts of words contained in an inputted speech with the beginning part dictionary of the memory. The dictionary management part can read the ending part dictionary or the beginning part dictionary based on the word order data while the recognition part is recognizing the beginning part of a word. This reduces a delay in speech recognition processing caused by the read of the dictionary data from the auxiliary storage for speech recognition. Particularly, in the speech recognition apparatus in which all the dictionary data for speech recognition cannot be recorded on the main storage due to the constraint of the memory, a delay in speech recognition processing caused by the read of the dictionary data from the auxiliary storage can be reduced.

In the speech recognition apparatus according to the present invention, the following is preferable. The beginning part dictionary stores beginning parts with respect to a whole group of words to be candidates of a plurality of sequentially associated words to be recognized. The dictionary management part reads the beginning part dictionary and the ending part dictionary of a group of words to be candidates of a first word among the words contained in the speech before the recognition part starts recognizing the inputted speech. When the recognition part recognizes an N-th (N=1, 2, 3, . . . ) word, the dictionary management part selects the ending part dictionary containing ending parts of a group of words to be candidates of an (N+1)-th word from the plurality of ending part dictionaries based on the N-th word and the word order data and starts reading. During the read, the recognition part recognizes a beginning part of the (N+1)-th word, using the beginning part dictionary.

The beginning part dictionary stores beginning parts with respect to a whole group of words to be candidates of a plurality of sequential words to be recognized. Therefore, while the dictionary management part is reading an ending part dictionary containing a group of words to be candidates of an (N+1)-th word based on an N-th word and the word order data, the recognition part can recognize the (N+1)-th word using the beginning part dictionary. Consequently, the dictionary management part can read a required ending part dictionary at an appropriate timing in accordance with the word recognized by the recognition part. Therefore, efficient speech recognition can be performed while the amount of data in the ending part dictionary on the memory is suppressed.

In the speech recognition apparatus according to the present invention, it is preferable that the dictionary management part reads the ending part dictionary containing ending parts of a group of words to be candidates of a first word among the words contained in the inputted speech, and the beginning part dictionary containing beginning parts of a group of words to be candidates of first and second words before the recognition part starts recognition, when the recognition part recognizes an N-th (N=1, 2, 3, . . . ) word, the dictionary management part reads the ending part dictionary containing ending parts of a group of words to be candidates of an (N+1)-th word and the beginning part dictionary containing beginning parts of a group of words to be candidates of an (N+2)-th word.

According to the above-mentioned configuration, the dictionary management part reads the ending part dictionary containing ending parts of a group of words to be candidates of a first word and the beginning part dictionary containing beginning parts of a group of words to be candidates of first and second words. Therefore, at a time when the recognition part recognizes the first sequential word, the processing of recognizing the second word can be started. Furthermore, the dictionary management part reads the ending part dictionary containing a group of words to be candidates of an (N+1)-th word and the beginning part dictionary containing beginning parts of a group of words to be candidates of an (N+2)-th word, as a time when the recognition part recognizes an N-th word. Because of this, the recognition part can start recognizing a subsequent word in the same way as in the case of recognizing the second and subsequent words. More specifically, the dictionary management part can read the ending part dictionary and the beginning part dictionary required by the recognition part at an appropriate timing in accordance with the word recognized by the recognition part.

In the speech recognition apparatus according to the present invention, it is preferable that when the recognition part matches a part of the beginning parts of the words with the speech using the beginning part dictionary read into the main storage, the dictionary management part starts reading the ending part dictionary and/or the beginning part dictionary based on the matching results.

According to the above-mentioned configuration, the dictionary management part can read an ending part dictionary corresponding to a portion of the ending parts shown by the matching results. This enables an appropriate ending part dictionary to be read efficiently.

In the speech recognition apparatus according to the present invention, it is preferable that the word order data is recorded in the ending part dictionary so as to correspond to respective ending parts of words, as dictionary identification data representing the beginning part dictionary containing beginning parts of a group of words having a possibility for following the ending parts of words or the ending part dictionary containing ending parts of the group of words, and the dictionary management part reads the beginning part dictionary or the ending part dictionary based on the dictionary identification data corresponding to the ending part of the word recognized by the recognition part.

The dictionary management part uses the dictionary identification data associated with the ending part of the word recognized by the recognition part, thereby reading the beginning part dictionary containing beginning parts of a group of words having a possibility for following the word or the ending part dictionary containing ending parts of the group of words.

In the speech recognition apparatus according to the present invention, it is preferable that the dictionary data contains a plurality of beginning part dictionaries, and based on the dictionary identification data corresponding to the ending part of the recognized word, the recognition part selects the beginning part dictionary containing beginning parts of a group of words having a possibility for following the recognized word from the plurality of beginning part dictionaries, and recognizes a word following the recognized word, using the selected beginning part dictionary.

The recognition part can select a beginning part dictionary containing beginning parts of a group of words having a possibility for following a subsequent recognized word, based on the dictionary identification data associated with the ending part of the word that has already been recognized. Therefore, the processing of recognizing a word following a recognized word can be performed efficiently, using an appropriate beginning part dictionary.

In the speech recognition apparatus according to the present invention, it is preferable that the dictionary management part deletes the ending part dictionary or the beginning part dictionary that become unnecessary after being used for recognizing a word by the recognition part, among the ending part dictionary and the beginning part dictionary read into the main storage, from the main storage. Unnecessary data on the memory is deleted, so that the capacity of a usable memory can be deleted.

In the speech recognition apparatus according to the present invention, it is preferable that the dictionary data contains a group of words having a possibility for being contained in a speech under a condition that the words are divided into beginning parts and ending parts in accordance with at least one of a phoneme number, a syllable number, a molar number, a word appearance frequency, and a capacity of a usable memory, and the beginning parts and the ending parts are recorded so as to be contained in the beginning part dictionary and the ending part dictionary respectively.

A speech recognition method according to the present invention for causing a computer to recognize a plurality of sequentially associated words contained in an inputted speech and output recognition results thereof, includes: an acoustic model reading operation of causing the computer to read an acoustic model previously recorded in an auxiliary storage into a main storage; a dictionary management operation of causing the computer to read dictionary data that includes a beginning part dictionary representing beginning parts of a group of words to be candidates of a word to be recognized, an ending part dictionary representing ending parts of the group of words, word order data representing a word order and correspondence data representing a correspondence between a beginning part dictionary and the ending part dictionary from the auxiliary storage into the main storage; and a recognition operation of causing the computer to successively recognize the plurality of sequentially associated words contained in the inputted speech by matching a group of words represented by the beginning part dictionary and the ending part dictionary read into the main storage with the inputted speech, using the acoustic model and the correspondence data read into the main storage. The dictionary data contains at least one beginning part dictionary storing data representing beginning parts of a plurality of words, and a group of ending part dictionaries storing data representing a group of ending parts corresponding to a group of beginning parts represented by the beginning part dictionary as a plurality of ending part dictionaries. In the dictionary management operation, the computer reads the word order data and the beginning part dictionary containing beginning parts of a group of words to be candidates of at least one word among the words contained in the inputted speech into the main storage, and reads the ending part dictionary and/or the beginning part dictionary based on the word order data, while a word is being recognized using the beginning part dictionary read into the main storage in the recognition operation.

A speech recognition program recorded on a recording medium according to the present invention causes a computer to execute processing of recognizing a plurality of sequentially associated words contained in an inputted speech and outputting recognition results thereof. The program causes the computer to execute: acoustic model reading processing of reading an acoustic model previously recorded in an auxiliary storage into a main storage; dictionary management processing of reading dictionary data that includes a beginning part dictionary representing beginning parts of a group of words to be candidates of a word to be recognized, an ending part dictionary representing ending parts of the group of words, word order data representing a word order and correspondence data representing a correspondence between a beginning part dictionary and an ending part dictionary from the auxiliary storage into the main storage; and recognition processing of successively recognizing the plurality of sequentially associated words contained in the inputted speech by matching a group of words represented by the beginning part dictionary and the ending part dictionary read into the main storage with the inputted speech, using the acoustic model and the correspondence data read into the main storage. The dictionary data contains at least one beginning part dictionary storing data representing beginning parts of a plurality of words, and a group of ending part dictionaries storing data representing a group of ending parts corresponding to a group of beginning parts represented by the beginning part dictionary as a plurality of ending part dictionaries. In the dictionary management processing, the program causes the computer to read the word order data and the beginning part dictionary containing beginning parts of a group of words to be candidates of at least one word among the words contained in the inputted speech into the main storage, and read the ending part dictionary and/or the beginning part dictionary based on the word order data, while a word is being recognized using the beginning part dictionary read into the main storage in the recognition processing.

According to the present invention, a speech recognition apparatus, a speech recognition program, and a speech recognition method can be provided, in which a delay in speech recognition processing caused by a waiting time for the read of dictionary data from the auxiliary storage can be reduced.

BRIEF DESCRIPTION OF THE DRAWINGS

FIG. 4 is a diagram representing an execution state of the processing shown in FIG. 3 on a time axis.

FIG. 5 is a diagram showing an exemplary case where the ending parts contained in the ending part dictionary 20*b*-1 shown in FIG. 2 are classified into a plurality of ending part dictionaries.

DETAILED DESCRIPTION OF THE INVENTION

Embodiment 1

Figure 1:
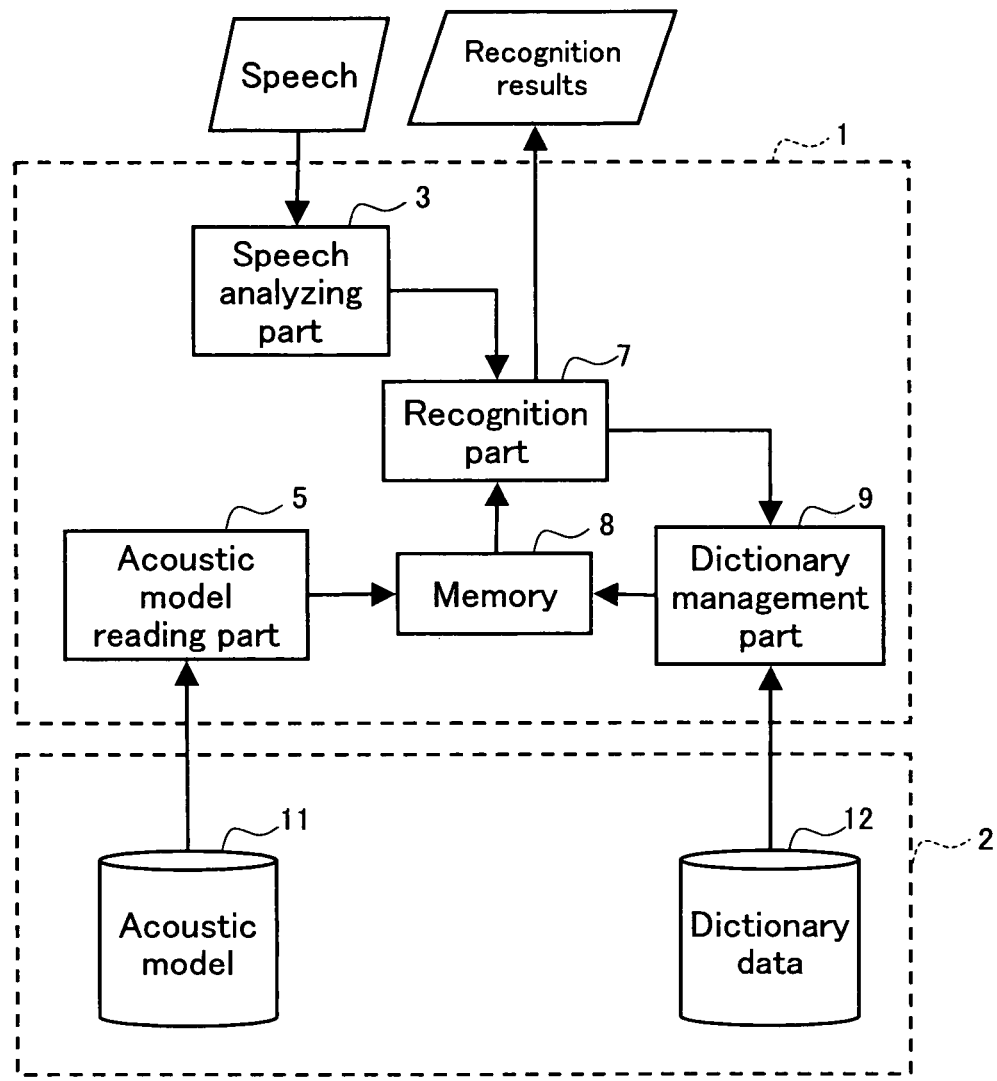
FIG. 1 is a functional block diagram showing an exemplary configuration of a speech recognition apparatus in Embodiment 1.

FIG. 1 is a functional block diagram showing an exemplary configuration of a speech recognition apparatus in the present embodiment. A speech recognition apparatus 1 shown in FIG. 1 recognizes a plurality of sequential words contained in an input speech, and outputs recognition results thereof. The speech recognition apparatus 1 may recognize a speech inputted through an input device such as a microphone, and output recognition results to an output device such as a display, a loudspeaker, or a printer. Furthermore, as another example, the speech recognition apparatus 1 may receive speech data from a higher-order application, and return recognition results of the speech data to the higher-order application.

The speech recognition apparatus 1 includes a speech analyzing part 3, an acoustic model reading part 5, a recognition part 7, a memory 8, and a dictionary management part 9. The speech recognition apparatus 1 is connected to an auxiliary storage 2. In the present embodiment, the auxiliary storage 2 stores an acoustic model 11 and dictionary data 12.

The speech recognition apparatus 1 is composed of a computer including at least a CPU and the memory 8. Each function of the speech analyzing part 3, the acoustic model reading part 5, the recognition part 7, and the dictionary management part 9 is realized when the CPU executes a predetermined program loaded into the memory 8. Although FIG. 1 illustrates a configuration in which the acoustic model reading part 5, the recognition part 7, and the dictionary management part 9 read or write data with respect to one memory 8, a plurality of memories 8 may be provided.

The auxiliary storage 2 may be, for example, a storage device connected to the CPU of the speech recognition apparatus 1 via a bus, or a storage device connected to the speech recognition apparatus 1 via a network.

The speech recognition apparatus 1 may be composed of, for example a general-purpose computer such as a personal computer. Furthermore, the speech recognition apparatus 1 can also be composed of a computer incorporated in electronic equipment such as a car navigation device, a mobile telephone, a personal digital assistant (PDA), or a display.

The dictionary management part 9 reads required data from the dictionary data 12. More specifically, the dictionary management part 9 reads only data required for recognition processing from the dictionary data 12 at any time, and deploys it on the memory 8 provided in the computer of the speech recognition apparatus 1. The dictionary data 12 represents a group of words to be candidates of a word to be recognized. The dictionary data 12 contains, for example, character string data of each word, information representing the reading of each word, and information on a grammar representing the order of each word. Examples of the information representing the reading of each word include data such as a phoneme string, a syllable string, and a phonetic symbol string. Furthermore, examples of the information on the grammar representing the order of each word include a context-free grammar and a finite state grammar.

The dictionary data contains at least one beginning part dictionary and a plurality of ending part dictionaries. The beginning part dictionary is data representing a plurality of beginning parts of words. The ending part dictionary is data representing a group of ending parts corresponding to a group of beginning parts represented by the beginning part dictionary. A group of ending parts are recorded separately in a plurality of ending part dictionaries. A specific example of the dictionary data will be described later.

The acoustic model 11 is, for example, data in which the characteristics of a speech are modeled statistically for each phoneme. An example of the acoustic model 11 includes a Hidden Markov Model (HMM). The acoustic model reading part 5 reads the acoustic model 11 from the auxiliary storage 2 into the main storage.

The recognition part 7 receives phoneme strings of beginning parts and ending parts of a group of words to be candidates of a word to be recognized, from the dictionary management part 9. The recognition part 7 extracts data corresponding to the received phoneme strings of the beginning parts and ending parts from the acoustic model 11, and generates acoustic model strings of the beginning parts and acoustic model strings of the ending parts.

When a speech is inputted to the speech recognition apparatus 1, the speech analyzing part 3 analyzes the inputted speech and converts it to a speech feature value. The speech feature value is given to the recognition part 7.

The recognition part 7 matches the speech feature value of the inputted speech with the acoustic model strings of the group of beginning parts and the acoustic model strings of the group of ending parts, thereby calculating the similarities with respect to beginning parts and ending parts of the respective words to be candidates. Based on these similarities, words contained in a speech are recognized. The recognition part 7 successively recognizes words in the order from the leading edge of the input speech until the speech is completed. The recognition part 7 gives data representing the recognized word to the dictionary management part 9.

The dictionary management part 9 reads phoneme strings of beginning parts or ending parts of a group of words to be candidates of a word to be uttered next, in accordance with the word recognized by the recognition part 7, and gives the phoneme strings to the recognition part 7. The recognition part 7 and the dictionary management part 9 repeat the above recognition processing until the input speech is completed. When the input speech is completed, the recognition part 7 outputs the recognized word string as recognition results. The recognition results are output, for example, as character string data.

(Specific Example of Dictionary Data)

Figure 2:
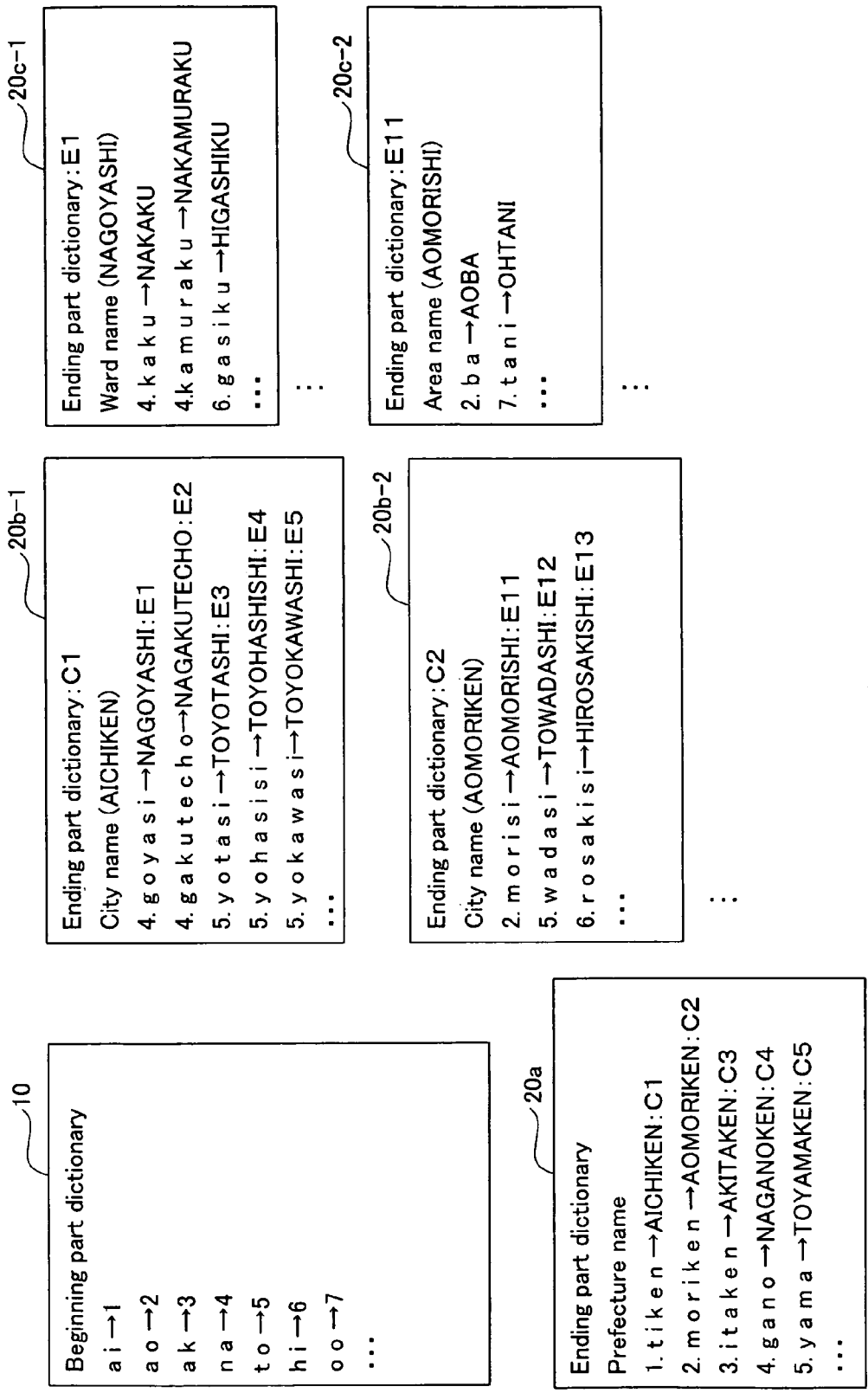
FIG. 2 is a diagram showing specific examples of a beginning part dictionary and ending part dictionaries contained in dictionary data.

FIG. 2 is a diagram showing specific examples of a beginning part dictionary and ending part dictionaries contained in the dictionary data 12. FIG. 2 shows an example of dictionary data used for recognizing an address in Japan in the case where the address is inputted to the speech recognition apparatus 1 as a speech. A speech representing the address contains a plurality of sequential words (e.g., a word representing a prefecture name→a word representing a city name→a word representing a ward name→a word representing an area name). Herein, the area name is assumed to be a place name that follows a city/ward/town/village name and excludes a street number and a house number.

The beginning part dictionary 10 shown in FIG. 2 is data representing beginning parts of the whole group of words that may be contained in a speech. In the beginning part dictionary 10, phoneme strings of beginning parts and data associating the beginning parts with ending parts are recorded with respect to each beginning part. For example, the first data "ai→1" in the beginning part dictionary 10 is data in which a phoneme string "ai" of a beginning part "AI" in a word "AICHIKEN" is associated with a number "1" for associating the beginning part "AI" with an ending part "CHIKEN". In FIG. 2, the display of contents of the beginning part dictionary 10 is partially omitted.

Ending part dictionaries 20a, 20b-1, 20b-2, 20c-1, and 20c-2 are data representing ending parts corresponding to the beginning parts represented by the beginning part dictionary 10. The ending part dictionaries 20b-1, 20b-2, 20c-1, and 20c-2 contain dictionary identification data "C1", "C2", "E1", and "E11" for identifying the respective ending part dictionaries.

In the ending part dictionaries 20a, 20b-1, 20b-2, 20c-1, and 20c-2, phoneme strings of the ending parts, data for associating the ending parts with the beginning parts, character strings of words represented by the ending parts, and dictionary identification data associated with the ending parts are recorded with respective to each ending part. The dictionary identification data associated with the ending part represents, for example, an ending part dictionary containing a group of words to be candidates of a word following the ending part.

For example, in the ending part dictionary 20a, data representing ending parts of prefecture names are collected. The first data "1. tiken→AICHIKEN: C1" in the ending part dictionary 20a contains a phoneme string "tiken" of an ending part, a number "1" for associating an ending part "CHIKEN" with a beginning part "AI", a character string "AICHIKEN" representing a word, and dictionary identification data "C1". The dictionary identification data "C1" represents an ending part dictionary herein, the ending part dictionary 20b-1 of a city name of AICHIKEN) containing a group of words to be candidates of a word following "AICHIKEN".

The ending part dictionary 20b-1 contains identification data "C1" for identifying an ending part dictionary, and data representing ending parts of the names of cities (including a town and a village) in AICHIKEN. Similarly, the ending part dictionary 20b-2 contains identification data "C2", and data representing ending parts of the names of cities (including a town, a village, and a county). The ending part dictionary 20c-1 contains identification data "E1", and data representing the names of wards in NAGOYASHI. The ending part dictionary 20c-2 contains identification data "E11" and data representing ending parts of the names of areas in AOMORISHI.

The beginning part dictionary 10 and the ending part dictionaries 20a, 20b-1, 20b-2, 20c-1, and 20c-2 may be recorded, for example as files for each dictionary or recorded as tables for each dictionary. Furthermore, a plurality of dictionaries may be recorded as one file, or one dictionary may be recorded under the condition of being divided into a plurality of files. Furthermore, for example, a group of dictionaries that may be read simultaneously can also be recorded in one file or table, as in a combination between the beginning part dictionary 10 and the ending part dictionary 20a of a prefecture name. That is, the dictionary data may be configured so that data can be identified for each dictionary when the dictionary management part 9 reads required data from the dictionary data 12.

Thus, the ending parts of the group of words that may be contained in a speech are recorded under the condition of being classified into a plurality of ending part dictionaries, considering the meanings of the words. In the example shown in FIG. 2, all the ending part dictionaries corresponding to the beginning part dictionary 10 are not shown, and are partially omitted. Furthermore, the display of data contained in each ending part dictionary is also omitted partially. Furthermore, the data configuration of the ending part dictionary and the beginning part dictionary are not limited to the example shown in FIG. 2.

(Method for Dividing a Word to a Beginning Part and an Ending Part)

As shown in FIG. 2, in order to create a beginning part dictionary and an ending part dictionary, it is necessary to record a word under the condition that the word is divided to a beginning part and an ending part. Herein, an example of a method for dividing a word to a beginning part and an ending part will be described. As one method, a word is divided on an acoustic model basis (a phoneme, a syllable, or a molar number), and any of divided positions can be set to be a divided position of a beginning part and an ending part. For example, in the case of dividing a word with a syllable, two syllables from the leading edge of the word can be set to be a beginning part, and the third and subsequent syllables can be set to be an ending part. Which syllable(s) from the leading edge should be set to be a beginning part may be determined depending upon, for example, the available capacity of the memory 8, the read time from the external storage device, the appearance frequency, and the like. Furthermore, in the case where there is a sufficient usable memory capacity, the reduction amount of a delay of processing can be increased by prolonging a beginning part. For example, regarding a word having a higher utterance frequency compared with the other words, the length of a beginning part of the word can be increased, compared with that of the other words.

(Operation Example of a Speech Recognition Apparatus)

Figure 3:
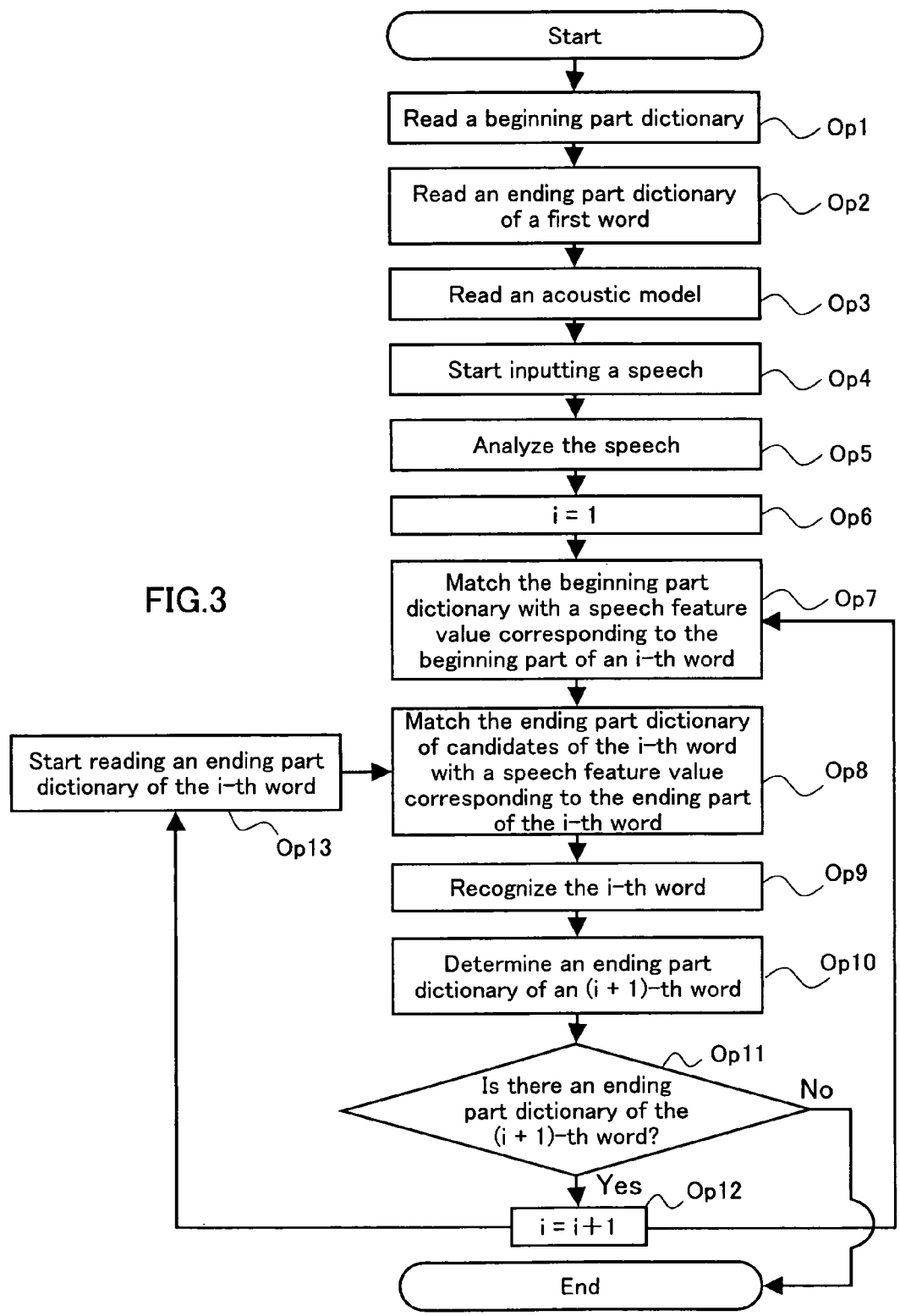
FIG. 3 is a flow chart showing exemplary processing in which a speech recognition apparatus recognizes a speech.

FIG. 3 is a flowchart showing exemplary processing in which the speech recognition apparatus 1 recognizes a speech. In the operation example, the case where an address in Japan is inputted as a speech and recognized will be described by way of a specific example. The speech recognition apparatus 1 in the operation example recognizes a speech on the precondition that a first word contained in the inputted speech represents a prefecture name, a subsequent word represents the name of a city, a town, a county, or a village contained in the prefecture, and a further subsequent word presents the name of a ward or an area contained in the city, town, county, or village. Thus, in the present embodiment, it is a precondition that a group of words to be candidates of a plurality of respective sequential words to be recognized are associated by a grammar representing the order of words or the like. Specific examples of association will be described below, illustrating a prefecture in Japan, a city in Aichi prefecture, a ward in Nagoya city, and the like.

Before a speech is inputted to the speech recognition apparatus 1, first, the dictionary management part 9 reads a beginning part dictionary from the auxiliary storage 2 into the memory 8 that is a main storage (Op 1). The beginning part dictionary to be read herein contains data representing beginning parts of all the words that may be contained in the speech.

The dictionary management part 9 also reads an ending part dictionary containing ending parts of a group of words to be candidates of a word that can be uttered in the beginning part of the inputted speech (Op 2). The group of words to be candidates of a word that can be uttered in the leading part is previously determined depending upon the specification of the speech recognition apparatus 1. For example, in the case where the specification of the speech recognition apparatus 1 is the one that recognizes an address, the word to be uttered in the leading part is determined as a prefecture name. As the specific examples of Op1 and Op2, the dictionary management part 9 first reads the beginning part dictionary 10 representing staring parts of all the words and the ending part dictionary 20a representing ending parts of prefecture names shown in FIG. 2.

The acoustic model reading part 5 reads the acoustic model 11 from the auxiliary storage 2 into the memory 8 (Op 3). Because of this, the recognition part 7 can perform recognition processing using the acoustic model, the beginning part dictionary, and the ending part dictionary read into the memory 8, regarding the beginning part and the ending part of at least a leading word. Furthermore, regarding the beginning part of a word following the word in the leading part, recognition processing can be performed using the acoustic model and the beginning part dictionary read into the memory 8.

When a speech input is started (Op 4), the speech analyzing part 3 analyzes the inputted speech and converts it to a speech feature value (Op 5). Herein, the speech analyzing part 3 divides the inputted speech to some frames along with a time axis, and calculates a speech feature value with respect to each frame. Examples of the speech feature value include a spectrum and a cepstrum.

The recognition part 7 initializes a variable i to "1" (Op 6). The recognition part 7 matches the beginning parts of words represented by the beginning part dictionary read into the memory 8 in Op 1 with the speech feature value of the frame corresponding to the beginning part of an i-th word from the leading edge of the inputted speech (Op 7). In this matching, the acoustic model read in Op 3 is used.

In the beginning part dictionary, each beginning part is represented in a phoneme string. The recognition part 7 generates an acoustic model string corresponding to each phoneme string contained in the beginning part dictionary, using the acoustic model 11. In the example shown in FIG. 2, acoustic model strings corresponding to the respective phoneme strings "ai", "ao", "ak", "na" . . . (the subsequent phoneme strings are omitted) contained in the beginning part dictionary 10 are generated. The recognition part 7 matches the acoustic model strings corresponding to the respective phoneme strings with the speech feature value of the frame corresponding to the beginning part of the i-th word from the leading edge of the inputted speech, thereby calculating the similarities between the acoustic model strings corresponding to the respective phoneme strings and the speech feature value. In the case where i=1, the recognition part 7 calculates the similarities between the feature value of the frame corresponding to the leading part of the inputted speech and the acoustic model strings.

Next, the recognition part 7 matches the ending parts of the words represented by the ending part dictionary read into the memory 8 with the speech feature value of the frame corresponding to the ending part of the i-th word from the leading edge of the inputted speech, using the acoustic model (Op 8). Herein, the ending part dictionary used for matching is an ending part dictionary hereinafter, referred to as an "ending part dictionary of the i-th word") containing ending parts of a group of words to be candidates of a word to be recognized in the i-th time by the recognition part 7. If the ending part dictionary of the i-th word has not been read into the memory 8, the recognition part 7 stands by until the dictionary management part 9 completes the read. In the case where i=1, the ending part dictionary 20a of the first word has already been read in Op 2. Therefore, the recognition part 7 can recognize the ending part of the first word using the ending part dictionary 20a, without standing by. In the example shown in FIG. 2, acoustic model strings corresponding to the respective phoneme strings "tiken", "moriken", "itaken" . . . (the subsequent phoneme strings are omitted) of the ending part dictionary 20a of the prefecture name that has already been read, and the similarities between these acoustic model strings and the speech feature value of the frame corresponding to the ending part of the first word are calculated.

The recognition part 7 recognizes the i-th word from the leading edge of the inputted speech based on the similarity of each phoneme string of the beginning part dictionary calculated in Op 7, and the similarity of each phoneme string of an ending part dictionary calculated in Op 8 (Op 9). The recognition part 7 can recognize, as the i-th word, a word of a phoneme string in which the sum of the similarity of the beginning part and that of the ending part is highest, for example, among the words obtained by combining a plurality of beginning parts contained in the beginning part dictionary, and a plurality of ending parts contained in the ending part dictionaries.

In the example shown in FIG. 2, in the case where i=1, the recognition part 7 combines the beginning part contained in the beginning part dictionary 10 with the ending part contained in the ending part dictionary 20a to generate a phoneme string of a prefecture name. Herein, for example, in a phoneme string "ai" in the beginning part dictionary 10, the data "1" for associating the beginning part with the ending part is recorded. Therefore, the recognition part 7 can combine the beginning part "ai" of the beginning part dictionary 10 with the ending part "1. tiken" in the ending part dictionary 20a to generate a phoneme string "aitiken" of a prefecture name.

Thus, regarding the respective phoneme strings "aitiken", "aomoriken", "akitaken", "naganoken" . . . (the subsequent phoneme strings are omitted) of the prefecture names thus generated, the sum of the similarity of the acoustic model string of the beginning part and the similarity of the acoustic model string of the ending part is calculated, whereby the prefecture name of a phoneme string having the highest similarity is recognized as the first word of the inputted speech.

The following may also be performed. The similarity between a connected acoustic model string in which the acoustic model string of a beginning part is connected to the acoustic model string of an ending part, and the inputted speech is calculated, and a word corresponding to the connected acoustic model string having a highest similarity is recognized as the word of the inputted speech.

The recognition part 7 gives the word recognized as described above to the dictionary management part 9. The dictionary management part 9 determines an ending part dictionary containing a group of words to be candidates of an (i+1)-th word, based on the given word (Op 10). The dictionary management part 9 can determine the (i+1)-th ending part dictionary, based on the dictionary identification data associated with the ending part of the given word in the ending part dictionary that has already been read. The dictionary identification data is recorded so as to be associated with each ending part in an ending part dictionary, and represents an ending part dictionary containing a group of words to be candidates of a word following the ending part.

For example, in the ending part dictionary 20a of a prefecture name shown in FIG. 2, dictionary identification data "C1", "C2", . . . respectively corresponding to phoneme strings "tiken", "moriken", . . . (the subsequent phoneme strings are omitted) are recorded. In the example shown in FIG. 2, the dictionary identification data "C1" and "C2" respectively represent the ending part dictionaries 20b-1 and 20b-2. For example, in the case where "aitiken" is given to the dictionary management part 9 as the i-th word, the dictionary management part 9 refers to the dictionary identification data "C1" associated with the phoneme string "tiken" of the ending part dictionary 20a. Because of this, the dictionary management part 9 determines that the ending part dictionary 20b-1 (ending part dictionary containing city names of AICHIKEN) having "C1" as dictionary identification data is an ending part dictionary (i.e., the ending part dictionary of the (i+1)-th word) containing a group of words to be candidates of the subsequent (i+1)-th word. Thus, by determining an ending part dictionary used for recognizing a subsequent word, it becomes possible to read only an ending part dictionary required for recognizing a word at an appropriate timing.

Furthermore, for example, as in the ending part dictionaries 20c-1 and 20c-2 shown in FIG. 2, there may be the case where a subsequent dictionary is not specified. In this case, it is determined that all the words to be recognized have been recognized, and the speech recognition processing is completed. More specifically, in the case where there is no ending part dictionary of the (i+1)-th word (No in Op 11), the speech recognition processing is completed.

When the ending part dictionary of the (i+1)-th word is determined (Yes in Op 11), the dictionary management part 9 deletes the ending part dictionary used for matching the i-th word from the memory 8. The deletion of a dictionary that will not be used any more from the memory 8 can suppress the amount of a usable memory. For example, when a prefecture name is recognized as the first word of an inputted speech at i=1, the dictionary management part 9 deletes the ending part dictionary 20a of a prefecture name from the memory 8.

After Op 11, 1 is added to the variable i (Op 12). After that, the dictionary management part 9 starts reading the ending part dictionary determined in Op 10 (i.e., the ending part dictionary of the i-th word) (Op 13). Substantially at the same time with the read of the ending part dictionary (Op 13), the recognition part 7 matches the beginning part of a word represented by the beginning part dictionary with the speech feature value of the frame corresponding to the i-th word (Op 7).

The case where a prefecture name "aitiken" (AICHIKEN) is recognized as the first word in the example shown in FIG. 2 at i=2 will be described. In this case, the dictionary management part 9 reads the ending part dictionary 20b-1 represented by the dictionary identification data "C1" of "tiken" of the ending part dictionary 20a from the auxiliary storage 2 into the memory 8. Substantially at the same time with this, the recognition part 7 matches the phoneme strings in the ending part dictionary 10 with the speech feature value of the frame corresponding to the second word from the leading edge of the inputted speech. Because of this, the recognition part 7 performs matching of beginning parts of a city name, in parallel with the read processing of the ending part dictionary 20b-1 of a city name to be uttered subsequently to a prefecture name by the dictionary management part 9, based on the prefecture name recognized in the recognition part 7.

The processings from Op 7 to Op 13 are repeated until it is determined that there is no subsequent dictionary in Op 11. Because of this, strings of sequential words contained in the speech are recognized successively. For example, at i=2, in the case where the second word from the leading edge of the inputted speech is recognized as a combined word "nagoyasi" of the beginning part "na" (see the beginning part dictionary 10 in FIG. 2) and the ending part "goyasi" (see the ending part dictionary 20b-1), the dictionary management part 9 reads the ending part dictionary 20c-1 representing ward names in Nagoya city. At the same time with this, the recognition part 7 matches the beginning part of a ward name with the beginning part dictionary 10. Furthermore, the recognition part 7 matches the ending part of a ward name, using the read ending part dictionary 20c-1. It is assumed that "nakaku", for example, is obtained as recognition results. In the case where there is no ending part dictionary containing a group of words to be candidates of a word following a ward name (No in Op 11), "AICHIKEN, NAGOYASHI, NAKAKUL" is output as recognition results. Thus, words representing the names of a prefecture, a city, and a ward are successively recognized.

FIG. 4 is a diagram representing an execution state of processing shown in FIG. 3 on a time axis. In FIG. 4, a T-axis represents a time. In FIG. 4, times during which the processings from Op 7 to Op 13 shown in FIG. 3 are performed are respectively represented by arrows. As an example, the execution times of the processings in Op 7, 8, 9, 10-12 at i=1, and the execution times of the processings in Op 13, 7, and 8 at i=2 are represented by arrows, respectively. At i=1, the processings in Op 7, 8, 9 and Op 10-12 are performed successively, and the processing in Op12 is completed at T1. The processing of reading the ending part dictionary of the second word into the memory 8 in Op 13 and the processing of matching the beginning part of the second word in Op 7 are started simultaneously. Herein, the processing in Op7 proceeds even during the processing of reading the ending part dictionary in Op 13, so that a delay in the processing is reduced. The processing in Op 13 is completed at a time T2. More specifically, the read of the ending part dictionary is completed at the time T2. From the time T2, the matching processing in Op8 is performed using the ending part dictionary read in Op 13.

The execution time of the processing shown in FIG. 4 is an example, and the operation of the speech recognition apparatus 1 is not limited thereto. For example, in FIG. 4, although the processing in Op 7 is completed earlier than that in Op 13 at i=2, the processing in Op 13 may be completed earlier than that in Op 7.

Furthermore, the above-mentioned processing shown in FIG. 3 is also the one showing an example of the operation of the speech recognition apparatus 1, and the operation of the speech recognition apparatus according to the present invention is not limited thereto. For example, in the processing shown in FIG. 3, the recognition part 7 recognizes a word based on the sum of a similarity calculated using the beginning part dictionary and a similarity calculated using the ending part dictionary. Alternatively, the following may be possible: only the beginning part is recognized using the beginning part dictionary, and only the ending part is recognized using the beginning part dictionary, whereby a word obtained by combining the recognized beginning part and ending part is determined as recognition results.

Furthermore, the configurations of the beginning part dictionary and the ending part dictionary contained in the dictionary data 12 are not limited to those shown in FIG. 2. The ending part dictionary shown in FIG. 2 has a configuration in which words representing lower-order concepts contained in one higher-order concept are collected in one ending part dictionary. More specifically, in the example shown in FIG. 2, ending parts of words representing prefecture names are provided, and further, ending part dictionaries of words representing cities contained in the respective prefectures are provided for each prefecture. However, words having different concepts may be contained in one dictionary. For example, a group of words to be candidates following a certain word may be included in one dictionary, and the dictionary may be recorded with data for associating the dictionary with the word.

(Modified Example of Ending Part Dictionary)

Furthermore, as a modified example of the ending part dictionary shown in FIG. 2, words representing lower-order concepts contained in one higher-order concept can also be recorded under the condition of being classified into a plurality of ending part dictionaries in accordance with the beginning parts of the words. FIG. 5 is a diagram showing an exemplary case where the ending parts contained in the ending part dictionary 20b-1 shown in FIG. 2 are classified into a plurality of ending part dictionaries. In FIG. 5, the ending parts contained in the ending part dictionary 20b-1 are recorded under the condition of being classified into an ending part dictionary 20b-11 containing ending parts "goyasi", "gakutecho" . . . corresponding to the beginning part "n", an ending part dictionary 20b-12 containing ending parts "yotasi", "yohasisi", "yokawasi" . . . corresponding to a beginning part "t", and the other ending part dictionaries (not shown).

Thus, by recording ending part dictionaries in which ending parts corresponding to respective beginning parts are collected, the dictionary management part 9 can select an ending part dictionary to be read, based on matching results, at a time when the recognition part 7 matches a portion of the beginning part of a word. For example, the recognition part 7 recognizes the first one phoneme of a beginning part of a word representing a city name as "n", the dictionary management part 9 can select the ending part dictionary 20b-11 shown in FIG. 5 as an ending part dictionary to be read. This decreases the size of an ending part dictionary to be read. Consequently, a time for reading an ending part dictionary is shortened, and the amount of a usable memory can be saved.

Figure 6:
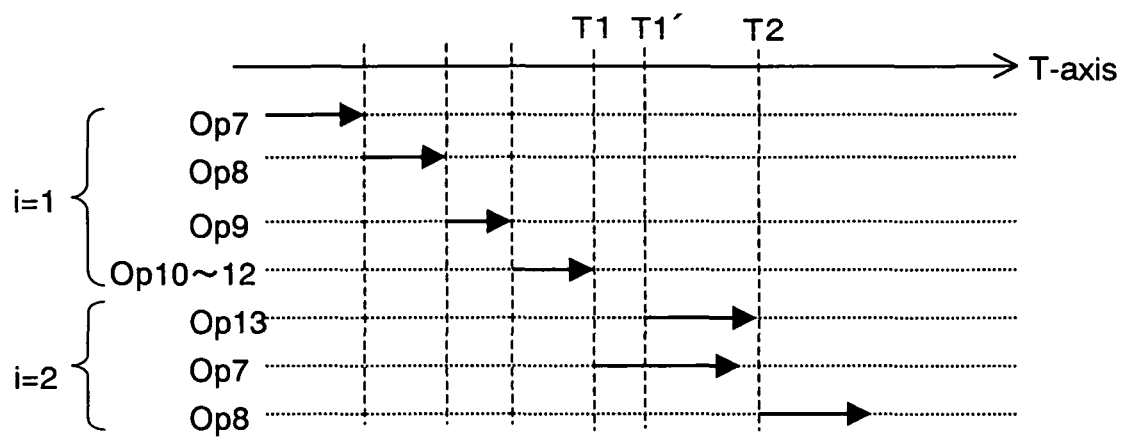
FIG. 6 is a diagram representing another execution state of the processing shown in FIG. 3 on a time axis.

FIG. 6 is a diagram representing an execution state of the processing shown in FIG. 3 on a time axis, in the case where an ending part dictionary to be read is selected based on the above-mentioned matching results of the beginning part of the word. In the execution state shown in FIG. 6, although the processing in Op 7 at i=2 is started at a time T1 when Op 10-12 at i=1 are completed, the processing in Op 13 is not started. Op 13 is started at a time T1'. The time T1' is a time when the matching results of the beginning part of the second word are obtained by the matching processing in Op 7. The ending part dictionary reading processing in Op 13 is executed based on the second matching results.

Embodiment 2

In Embodiment 1, speech recognition processing in the case where only one beginning part dictionary is contained in dictionary data has been described. In Embodiment 2, speech recognition processing in the case where a plurality of beginning part dictionaries are contained in dictionary data will be described. In the present embodiment, the recognition part 1 performs speech recognition processing by appropriately selecting a suitable beginning part dictionary from a plurality of beginning part dictionaries. The configuration of a speech recognition apparatus in the present embodiment is the same as that of the speech recognition apparatus 1 shown in FIG. 1.

Figure 7:
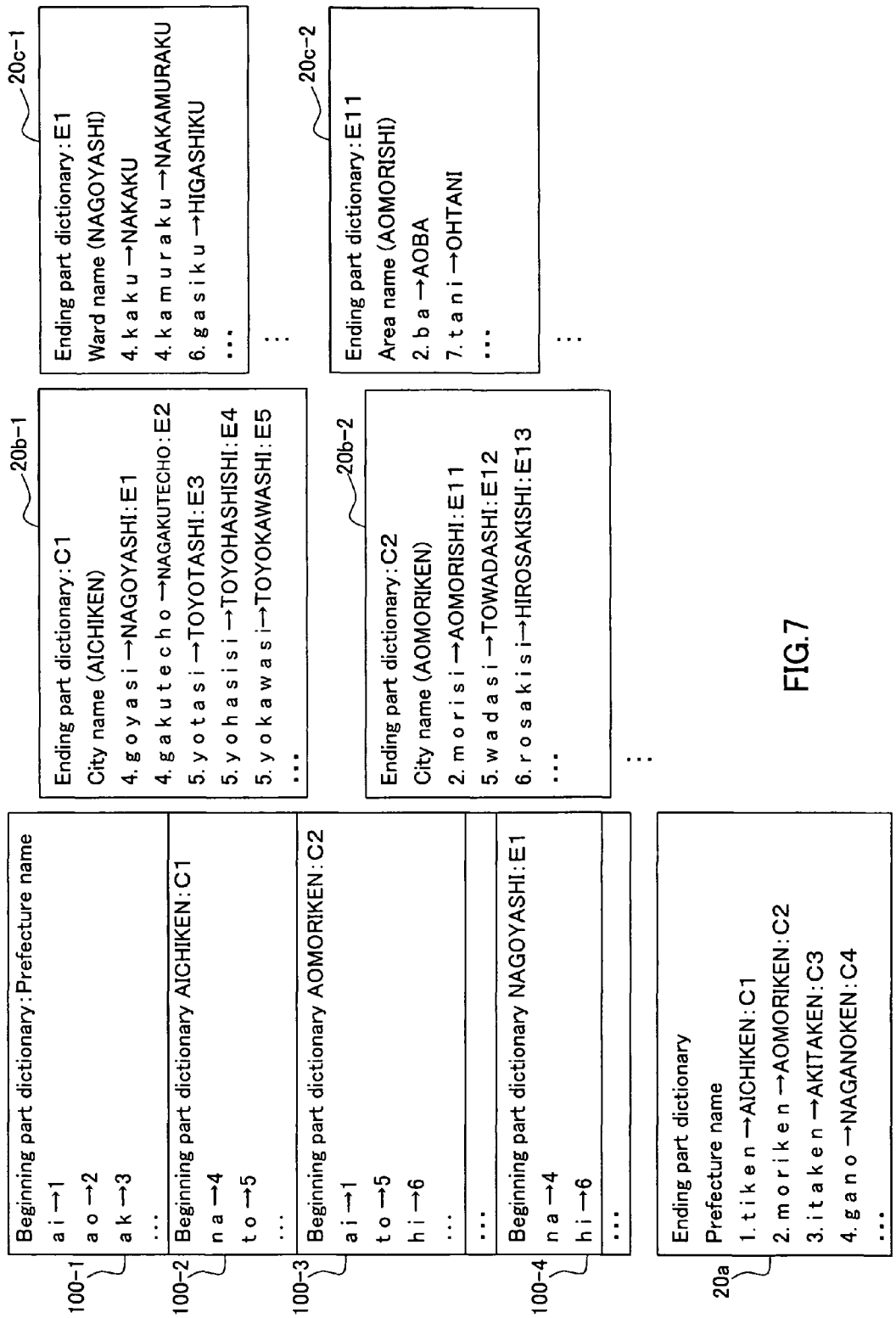
FIG. 7 is a diagram showing specific examples of beginning part dictionaries and ending part dictionaries in Embodiment 2.

FIG. 7 shows specific examples of beginning part dictionaries and ending part dictionaries contained in the dictionary data in Embodiment 2. In FIG. 7, the dictionaries containing the same contents as those of the dictionaries shown in FIG. 2 are denoted with the same reference numerals as those therein, and the description thereof will be omitted. The beginning part dictionaries in the dictionary data shown in FIG. 7 contain a plurality of beginning part dictionaries 100-1, 100-2, 100-3, and 100-4. These beginning part dictionaries are data in which beginning parts of all the words that may be contained in an inputted speech are recorded under the condition of being classified into a plurality of beginning part dictionaries. Herein, as an example, the beginning parts of a group of words are recorded under the condition of being classified into the beginning part dictionary 100-1 containing beginning parts of words representing prefecture names, beginning part dictionaries 100-2, 100-3 . . . , containing beginning parts of words representing the names of a city, a town, and a village contained in each prefecture, and the beginning part dictionary 100-4 . . . , containing beginning parts of words representing ward names or area names contained in each city.

As described later, the purpose of recording the beginning parts of a group of words under the condition that they are classified into a plurality of beginning part dictionaries is to enable the recognition part 7 to refer to only a required group of beginning parts in accordance with candidates of a word to be recognized, as described later. Thus, it is preferable that the beginning part dictionaries are provided, corresponding to a group of words to be candidates of the respective sequential words to be recognized.

The plurality of beginning part dictionaries 100-1, 100-2, 100-3, and 100-4 may be recorded, for example, as files for each dictionary, or may be recorded as tables for each dictionary. Furthermore, a plurality of dictionaries may be recorded in one file, or may be recorded under the condition that one dictionary is divided into a plurality of files. Furthermore, a group of dictionaries that can be read simultaneously (e.g., a combination of the beginning part dictionary 100-1 of a prefecture name and the ending part dictionary 20a of a prefecture name) can be recorded in one file or table.

Figure 8:
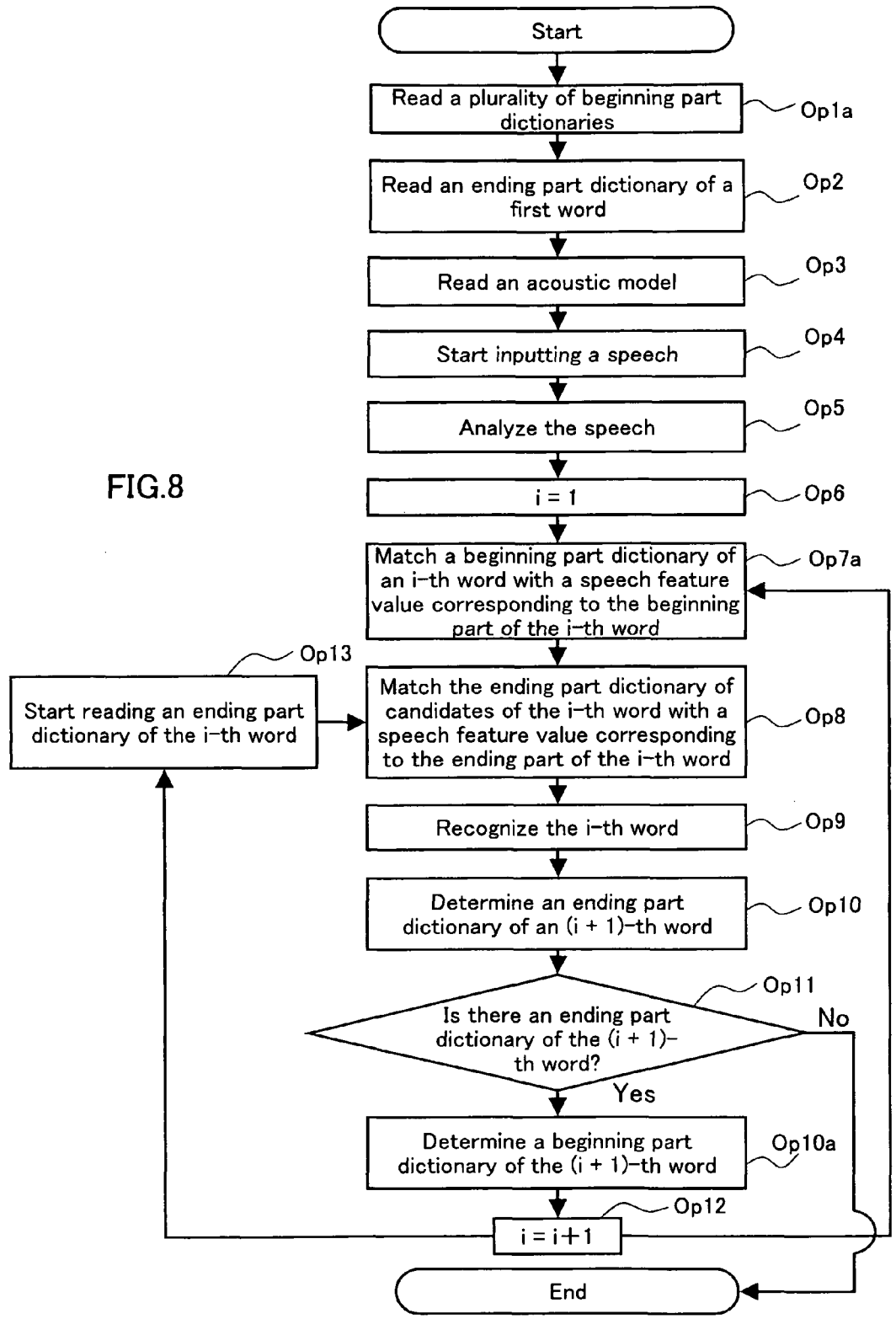
FIG. 8 is a flow chart showing exemplary processing of recognizing a speech in Embodiment 2.

FIG. 8 is a flowchart showing exemplary processing in which the speech recognition apparatus in Embodiment 2 recognizes a speech. In FIG. 8, the same processings as those shown in FIG. 2 are denoted with the same reference numerals as those therein, and the detailed description will be omitted.

As shown in FIG. 8, the dictionary management part 9 first reads all the plurality of beginning part dictionaries contained in the dictionary data 12 into the memory 8 (Op 1a). Beginning parts of all the words that may be contained in an inputted speech are recorded under the condition of being classified into the plurality of beginning part dictionaries read here. Specific examples of a part of the plurality of beginning part dictionaries to be read are the beginning part dictionaries 100-1, 100-2, 100-3, and 100-4 shown in FIG. 7.

The processings in Op 2-6 are the same as those in FIG. 2. In Op 7a, the recognition part 7 matches the beginning parts of the words represented by the beginning part dictionaries with the speech feature value of a frame corresponding to the beginning part of an i-th word from the leading edge of the inputted speech, using an acoustic model. The beginning part dictionary used in matching herein is a beginning part dictionary (hereinafter, referred to as the beginning dictionary of the i-th word) containing beginning parts of a group of words to be candidates of the i-th word. The recognition part 7 matches an acoustic model string corresponding to each phoneme string contained in the i-th beginning part dictionary, with the speech feature value of the frame corresponding to the beginning part of the i-th word from the leading edge of the inputted speech to calculate the similarity therebetween.

In the case where i=1, the specific example of the first beginning part dictionary is the beginning part dictionary 100-1 shown in FIG. 7. The beginning part dictionary 100-1 contains phoneme strings "ai", "ao", "ak" . . . (the subsequent phoneme strings are omitted) of the beginning parts of the words representing prefecture names that can be uttered first in a speech. The recognition part 7 calculates the similarity between the acoustic model string corresponding to each phoneme string and the feature value of a frame corresponding to a leading portion of a speech.

Next, the recognition part 7 matches the ending parts of the words represented by the ending part dictionary, with the speech feature value of the frame corresponding to the ending part of the i-th word, using an acoustic model (Op 8). The ending part dictionary used for matching herein is the ending part dictionary of the i-th word.

The recognition part 7 recognizes the i-th word from the leading edge of an inputted speech, based on the similarity of each phoneme string of the beginning part dictionary calculated in Op 7a, and the similarity of each phoneme string of the ending part dictionary calculated in Op 8 (Op 9).

When the i-th word is recognized, the dictionary management part 9 determines an ending part dictionary (hereinafter, referred to as an "ending part dictionary of a (i+1)-th word") containing ending parts of a group of words to be candidates of the (i+1)-th word, based on the i-th word (Op 10). In the case where there is an ending part dictionary of the (i+1)-th word (Yes in Op 11), the dictionary management part 9 also determines a beginning part dictionary (hereinafter, referred to as the "beginning part dictionary of the (i+1)-th word") containing beginning parts of a group of words to be candidates of the (i+1)-th word (Op 10a). The dictionary management part 9 can determine the (i+1)-th beginning part dictionary and the (i+1)-th ending part dictionary, based on the dictionary identification data associated with the ending part of the given word in the ending part dictionary that has already been read.

For example, in the ending part dictionary 20a of a prefecture name shown in FIG. 7, the dictionary identification data "C1" corresponding to phoneme strings "tiken" . . . (the subsequent phoneme strings are omitted) is recorded. In the example shown in FIG. 7, the dictionary identification data "C1" represents the ending part dictionary 20b-1 and the beginning part dictionary 100-2. For example, in the case where "aitiken" is given to the dictionary management part 9 as the first word, the dictionary management part 9 can determine that the beginning part dictionary 100-2 having "C1" as dictionary identification data to be the beginning part dictionary of the subsequent (i+1)-th word. Furthermore, the dictionary management part 9 determines that the ending part dictionary 20b-1 having "C1" as dictionary identification data is the (i+1)-th ending part dictionary. By determining the beginning part dictionary and the ending part dictionary used for recognizing a subsequent word, it becomes possible to read only the ending part dictionary required for recognizing a word into the memory 8 at a suitable timing, and it becomes possible to recognize a word by referring to only the beginning part dictionary required for recognition.

After Op 10, the dictionary management part 9 deletes the ending part dictionary used for matching the i-th word from the memory 8. In the case where i=1, when the processing in Op 10 with respect to the first word is completed, the dictionary management part 9 deletes the ending part dictionary 100-1 of a prefecture name and the ending part dictionary 20a of a prefecture name from the memory 8. Thus, by deleting the beginning part dictionary and the ending part dictionary of a word that has already been recognized by the recognition part 7 from the memory 8, the amount of a usable memory can be saved.

After that, 1 is added to the variable i (Op 12), and substantially at the same time with the read of an ending part dictionary (Op 13) by the dictionary management part 9, the recognition part 7 matches the beginning parts of the words represented by the beginning part dictionary determined in Op 10a, i.e., the beginning part dictionary of the i-th word, with the speech feature value of the frame corresponding to the i-th word (Op 7a).

The case where a prefecture name "aitiken" (AICHIKEN) is recognized as the first word in the example shown in FIG. 7 at i=2 will be described. In this case, the dictionary management part 9 reads the ending part dictionary 20b-1 represented by the dictionary identification data "C1" of "tiken" of the ending part dictionary 20a from the auxiliary storage 2 into the memory 8. Substantially at the same time with this, the recognition part 7 matches the phoneme strings in the beginning part dictionary 100-2 represented by the dictionary identification data "C1" with the speech feature value of the frame corresponding to the second word. Because of this, the processing of reading the ending part dictionary 20b-1 of a city name that can be uttered subsequently to a prefecture name is performed, based on the prefecture name recognized by the recognition part 7. Furthermore, in parallel with this, the recognition part 7 matches the beginning part dictionary 100-2 of a city name that can be uttered subsequently to the prefecture name with the speech feature value of the frame corresponding to a speech following the prefecture name. As a result, the recognition part 7 can perform matching processing (Op 7a) only with respect to the beginning part dictionary required for recognition among a plurality of beginning part dictionaries. Therefore, a time required for speech recognition processing is shortened.

The processings in Op 7a to Op 13 are repeated until it is determined that there is no subsequent dictionary in Op 11. Because of this, a string of sequential words contained in a speech is successively recognized.

Embodiment 3

In Embodiments 1 and 2, speech recognition processing in the case where the beginning part dictionary containing the beginning parts of all the words is previously read has been described. In Embodiment 3, the dictionary management part 9 previously reads a part of a plurality of beginning part dictionaries contained in the dictionary data 12. More specifically, in the present embodiment, the dictionary management part 9 reads a suitable beginning part dictionary at any time in accordance with the processing in the recognition part 7. The configuration of the speech recognition apparatus in the present embodiment is the same as that of the speech recognition apparatus 1 shown in FIG. 1.

Figure 9:
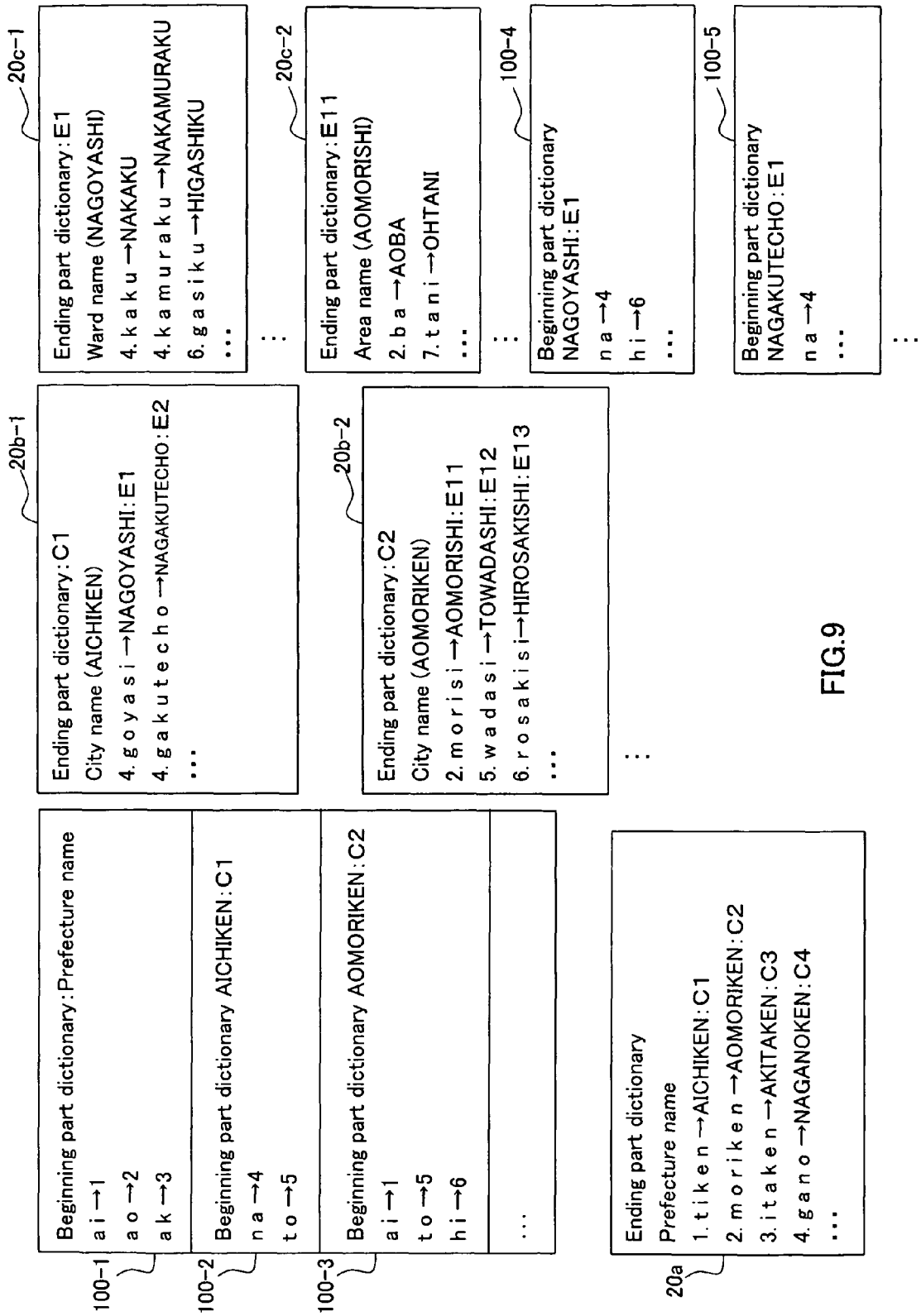
FIG. 9 is a diagram showing specific examples of beginning part dictionaries and ending part dictionaries in Embodiment 3.

FIG. 9 shows specific examples of beginning part dictionaries and ending part dictionaries contained in the dictionary data in Embodiment 3. In FIG. 9, the dictionaries containing the same contents as those in the dictionaries shown in FIG. 7 are denoted with the same reference numerals as those therein, and the detailed description will be omitted. The beginning part dictionaries in the dictionary data shown in FIG. 9 include a plurality of beginning part dictionaries 100-1, 100-2, 100-3, 100-4, and 100-5.

Among them, the beginning part dictionaries that are previously read by the dictionary management part 9 before a speech is inputted are the beginning part dictionary 100-1 of a prefecture name and the beginning part dictionaries 100-2 and 100-3 of a city name (also including a town name) in each prefecture. Thus, the dictionary management part 9 reads the beginning part dictionaries containing the beginning parts of a group of words to be candidates of two sequential words (e.g., a word representing a prefecture name and a word representing a city name).

Figure 10:
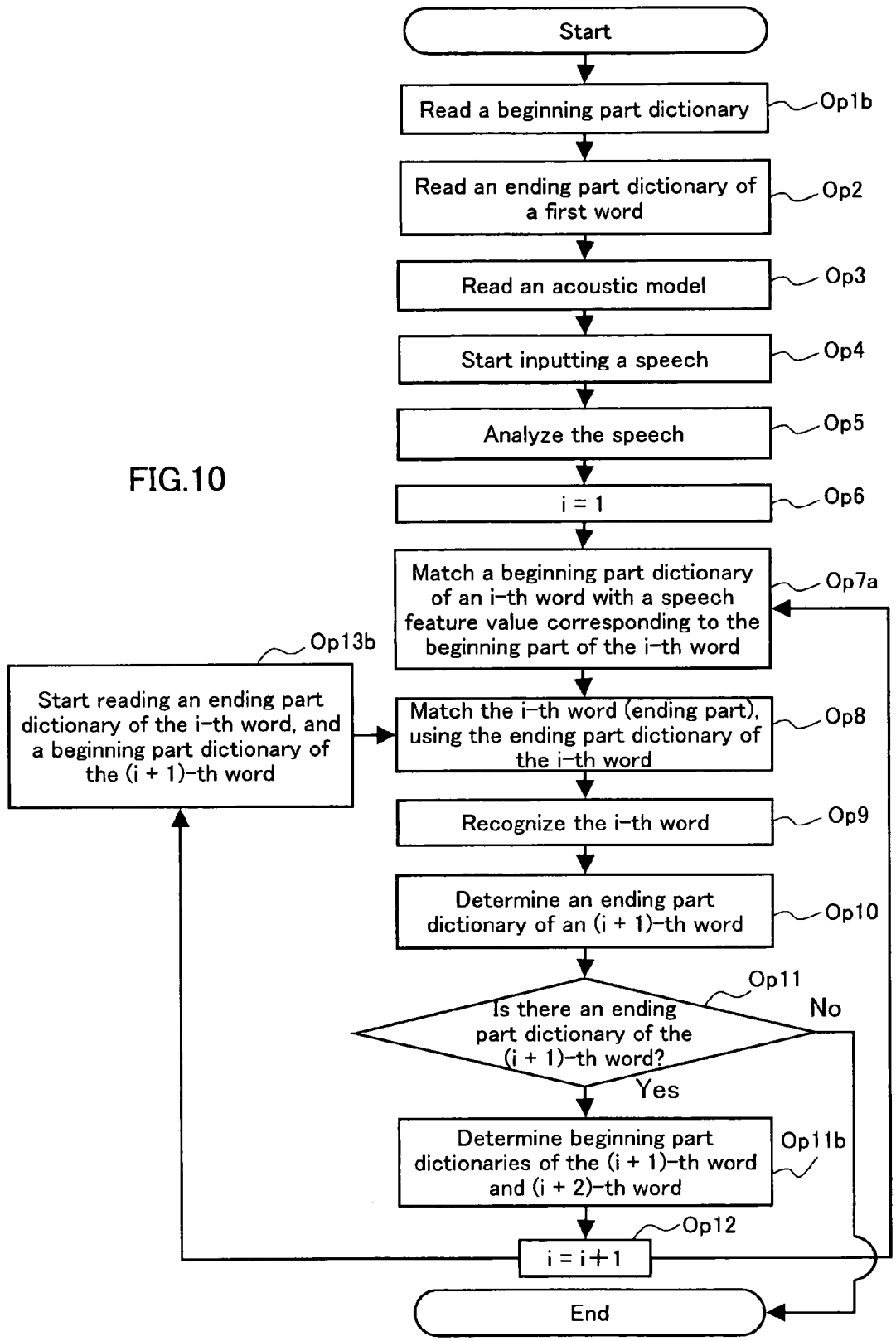
FIG. 10 is a flowchart showing exemplary processing of recognizing a speech in Embodiment 3.

FIG. 10 is a flowchart showing exemplary processing in which the speech recognition apparatus in Embodiment 3 recognizes a speech. In FIG. 10, the same processings as those shown in FIG. 8 are denoted with the same reference numerals as those therein, and the detailed description thereof will be omitted.

As shown in FIG. 10, the dictionary management part 9 first reads the beginning part dictionaries containing a group of words to be candidates of two sequential words into the memory 8 (Op 1b). The word at the leading edge of an inputted speech and the beginning parts of all the words to be candidates of a second word are recorded under the condition of being classified into a plurality of beginning part dictionaries read into the memory 8. Specific examples of a plurality of beginning part dictionaries to be read into the memory 8 are the beginning part dictionaries 100-1, 100-2, and 100-3 shown in FIG. 9. In the example shown in FIG. 9, the beginning part dictionary 100-1 contains beginning parts of a group of words to be candidates of a word representing a prefecture name at a leading edge of a speech. The beginning part dictionaries 100-2, 100-3 . . . contain the beginning parts of a group of words to be candidates of the word representing the name of a city, town, county, or village that can be uttered subsequently to the prefecture name.

The processings in Op 2 to Op 11 are the same as those in FIG. 8.

In the case where there is a (i+1)-th ending part dictionary (Yes in Op 11), the dictionary management part 9 determines the (i+1)-th beginning part dictionary in Op 10b. Furthermore, the dictionary management part 9 also determines the beginning part dictionary (hereinafter, also referred to as the beginning part dictionary of the (i+2)-th word) containing beginning parts of a group of words to be candidates of the (i+2)-th word. The dictionary management part 9 can determine the (i+2)-th beginning part dictionary, based on the dictionary identification data associated with the ending part of the given word, in the ending part dictionary that has already been read.

For example, in the ending part dictionary 20a of a prefecture name shown in FIG. 9, the dictionary identification data "C1" associated with the phoneme strings "tiken" . . . (the subsequent phoneme strings are omitted) of the ending parts is recorded. In the example shown in FIG. 9, the dictionary identification data "C1" represents the ending part dictionary 20b-1 and the beginning part dictionary 100-2. For example, in the case where "aitiken" is given to the dictionary management part 9 as the first word, the dictionary management part 9 can determine that the beginning part dictionary 100-2 having "C1" in the dictionary identification data is the subsequent (i+1)-th beginning part dictionary. Furthermore, the dictionary management part 9 determines that the ending part dictionary 20b-1 having "C1" as dictionary identification data is the (i+1)-th beginning part dictionary.

Furthermore, the dictionary management part 9 refers to the dictionary identification data "E1" and "E2" associated with each phoneme string of the ending parts contained in the ending part dictionary 20b-1. Based on these dictionary identification data, the dictionary management part 9 determines the beginning part dictionary of the (i+2)-th word. In this case, the beginning part dictionaries of the (i+2)-th word are the beginning part dictionaries 100-4 and 100-5 represented by the dictionary identification data "E1" and "E2". Regarding the ending parts contained in the ending part dictionary 20b-1, only two ending parts "goyasi" and "gakute" are displayed for the purpose of saving a drawing surface, and the remaining display is omitted.

After Op 10b, the dictionary management part 9 deletes the beginning part dictionary and the ending part dictionary used for matching the i-th word from the memory 8. In the example shown in FIG. 9, in the case where a prefecture name is recognized as the first word at i=1, the dictionary management part 9 deletes the beginning part dictionary 100-1 of a prefecture name and the ending part dictionary 20a of a prefecture name from the memory 8.

After Op 10b, 1 is added to the variable i (Op 12), and the dictionary management part 9 starts reading the ending part dictionary determined in Op 10, i.e., the ending part dictionary of the i-th word (Op 13b). Furthermore, in Op 13b, the dictionary management part 9 also starts reading the beginning part dictionary of the (i+1)-th word determined in Op 10b.

Substantially at the same time with the read of the beginning part dictionary and the ending part dictionary (Op 13b), the recognition part 7 matches the beginning part dictionary determined in Op 11b, i.e., the beginning parts of the words represented by the beginning part dictionary of the i-th word, with the speech feature value of the frame corresponding to the i-th word (Op 7a).

The case where a prefecture name "aitiken" (AICHIKEN) is recognized as the first word in the example shown in FIG. 9 at i=2 will be described. In this case, the dictionary management part 9 reads the ending part dictionary 20b-1 represented by the dictionary identification data "C1" associated with "tiken" of the ending part dictionary 20a from the auxiliary storage 2 into the memory 8. Furthermore, the dictionary management part 9 also reads the beginning part dictionaries 100-4 and 100-5 into the memory 8. Substantially at the same time with this, the recognition part 7 matches the phoneme strings of the beginning part dictionary 100-2 represented by the dictionary identification data "C1" with the speech feature value of the frame corresponding to the second word.

Because of this, the processing of reading the ending part dictionary 20b-1 of a city name that can be uttered subsequently to a prefecture name is performed, based on the prefecture name recognized by the recognition part 7. Furthermore, the processing of reading the beginning part dictionaries 100-4 and 100-5 of the words that can be uttered subsequently to the city name is also performed. Furthermore, in parallel with these processings, the recognition part 7 matches the beginning part dictionary 100-2 of a city name that can be uttered subsequently to the prefecture name, with the speech feature value of the frame corresponding to a speech following the prefecture name.

As described above, according to the present embodiment, the beginning part dictionary is also read at any time in accordance with the recognition processing, in addition to the ending part dictionary. Therefore, it is not necessary to previously read the beginning part dictionary with respect to the candidates of all the words. A beginning part dictionary is read at any time if required, merely by reading a beginning part dictionary with respect to the candidates of at least two sequential words. This can save the amount of a usable memory.

In the present embodiment, although an example of reading a beginning part dictionary with respect to candidates of two sequential words has been described, the beginning part dictionary to be read is not limited to the one for candidates of two sequential words. If the dictionary management part 9 reads the beginning part dictionary containing beginning parts of a group of words to be candidates of at least two sequential words into the memory, the recognition part 7 can match a portion corresponding to the beginning parts of at least two sequential words contained in an inputted speech with the beginning part dictionary read into the memory. Thus, after the recognition part 7 recognizes one word, while the dictionary management part 9 is reading the ending part dictionary and/or the beginning part dictionary in accordance with the recognized word, a speech following the recognized word can be matched with the beginning part dictionary containing beginning parts of words to be candidates of a word following the recognized word.

The speech recognition apparatus according to Embodiments 1-3 particularly exhibits the effect of reducing a response (time from the completion of an utterance to the presentation of recognition results), in the case where the speech recognition apparatus is composed of a platform having less resources (a CPU, a memory) as in incorporated equipment.

In the above Embodiments 1-3, although an example of recognizing an address has been described, the contents of a speech to be a target of the speech recognition apparatus according to the present invention is not limited to an address. The present invention is applicable to a speech recognition apparatus that recognizes a speech containing sequential words in which a group of words to be candidates of each word are associated with a previous word. Examples of the case where such sequential words are uttered include the case where an artist name, an album name, and a title name are uttered continuously, the case where a company name, a section name, a title name, and a full name are uttered continuously, and the case where a required time or distance, and a facility name are uttered continuously.

Furthermore, in the above Embodiments 1-3, the case where a plurality of words are recognized by recognizing words one by one has been described. However, the processing of recognizing sequential words is not limited to such processing.

(Modified Example of Data Representing Word Order)

Furthermore, in Embodiments 1-3, data representing a word order is recorded in an ending part dictionary as dictionary identification data associated with each ending part. However, the data representing a word order is not necessarily recorded under the condition of being contained in an ending part dictionary. For example, a grammar file storing data that represents a word order may be provided.

Figure 11:
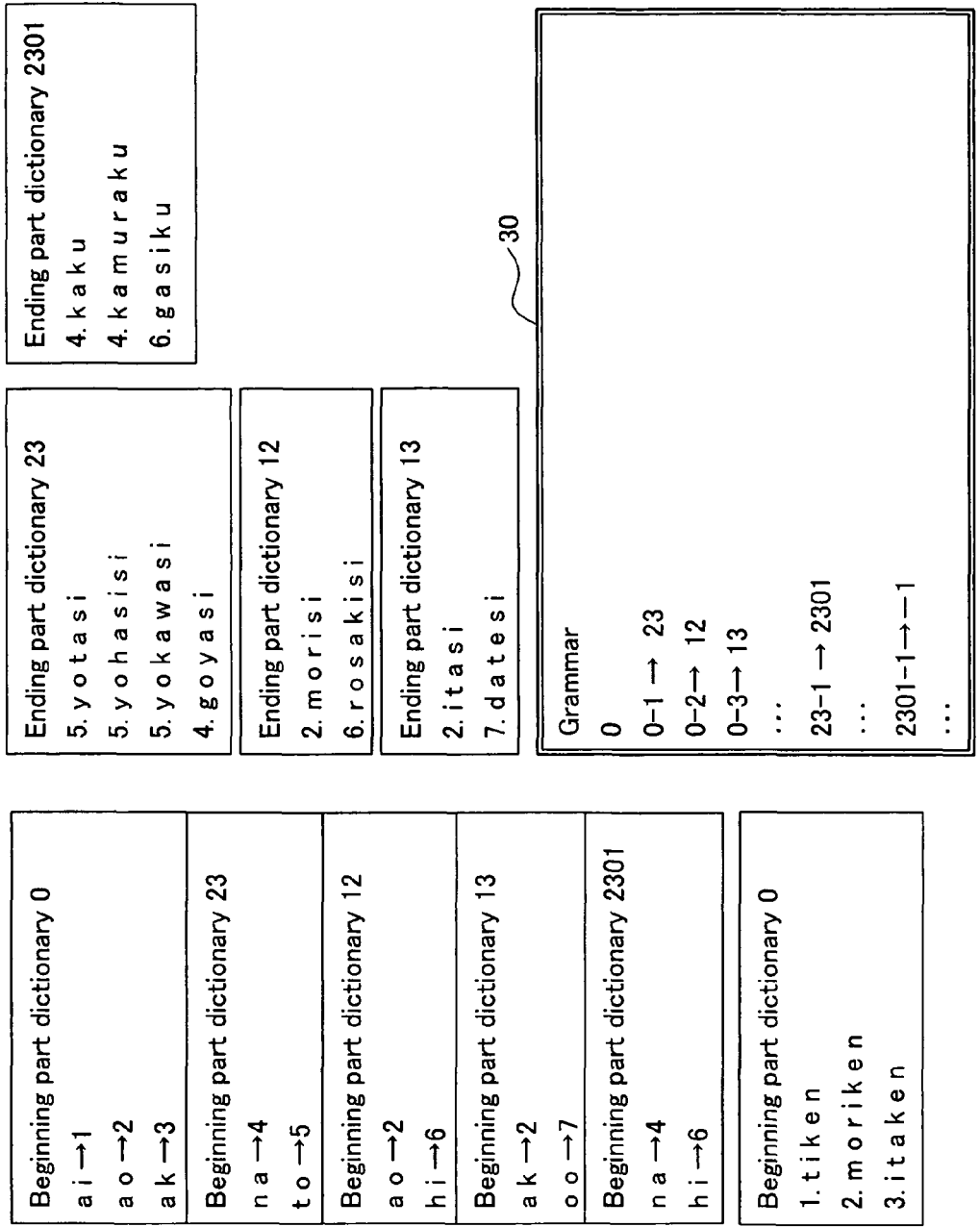
FIG. 11 is a diagram showing examples of beginning part dictionaries, ending part dictionaries, and a grammar file.

FIG. 11 is a diagram showing examples of beginning part dictionaries, ending part dictionaries, and a grammar file 30 representing the order of words contained in the dictionaries. In the beginning part dictionaries shown in FIG. 11, "0", "23", "12", "13", and "2301" are respectively recorded as dictionary identification data. Furthermore, in the ending part dictionaries corresponding to these beginning part dictionaries, "1", "23", "12", "13", and "2301" are also recorded as dictionary identification data.

In the grammar file 30, dictionary identification data "0" of a dictionary containing a group of words to be candidates of a word to be recognized first in an inputted speech is recorded in the first line. More specifically, the dictionary identification data of the dictionary to be read first is recorded in the first line. "0-1" in the second line represents the first word in the dictionary represented by the dictionary identification data "0". In FIG. 2, "0-1" represents a word "aitiken" composed of the first beginning part "ai" in the beginning part dictionary "0" and the first ending part "tiken" in the ending part dictionary "0". "23" adjacent to "0-1" with "→" interposed therebetween is dictionary identification data of a dictionary containing a group of words to be candidates of a word following "aitiken".

In the third to fifth lines of the grammar file 30, in the same way as in the second line, data representing a certain word and dictionary identification data of a dictionary containing a group of words to be candidates of a word following the certain word are recorded so as to be associated with each other. "2301-1→-1" in the sixth line means that there is no word following the first word "nakaku" in the dictionary represented by the dictionary identification data "2301", and a word to be recognized is completed. Because of this, for example, the recognition part 7 can recognize a speech uttered in the order of "aitiken", "nagoyasi", "nakaku".

By referring to the grammar file 30, the dictionary management part 9 can obtain a dictionary to be read first, a dictionary to be read subsequently to the recognition of a word by the recognition part 7, and information representing the completion of a word to be recognized. Furthermore, if the contents of the grammar file 30 are rewritten, a different utterance can be recognized using the same beginning part dictionary and the same ending part dictionary. For example, in the case where there is a possibility that the word "nakaku" is uttered first, and then, "nagoyasi" is uttered, the dictionary identification data "2301" of a dictionary containing "nakaku" may be recorded in the first line of the grammar file 30. By recording "2301-1→23" in the second and subsequent lines so that the dictionary to be candidates of a word following "nakaku" is the one containing "nagoyasi", the utterance "nakaku nagoyasi" can be identified by recording "2301-1→23".

The present invention is useful as a speech recognition apparatus, a speech recognition program, a speech recognition method, and a recording medium storing dictionary data used for them, which are capable of reducing a delay in a recognition time caused by a waiting time for a load from an auxiliary storage having a word dictionary for word recognition, in speech recognition processing of recognizing sequential words uttered by a user where all the speech recognition dictionaries cannot be placed on a main storage, and there is a constraint to a memory.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A speech recognition apparatus for recognizing a plurality of sequentially associated words contained in an inputted speech, and outputting recognition results thereof, comprising:

an acoustic model reading part for reading an acoustic model previously recorded in an auxiliary storage into a main storage;

a dictionary management part for reading dictionary data that includes a beginning part dictionary representing beginning parts of a group of words to be candidates of a word to be recognized, an ending part dictionary representing ending parts of the group of words, word order data representing a word order, and correspondence data representing a correspondence between the beginning part dictionary and the ending part dictionary, from the auxiliary storage into the main storage; and a recognition part for successively recognizing the plurality of sequentially associated words contained in the inputted speech by matching the group of words represented by the beginning part dictionary and the ending part dictionary read into the main storage with the inputted speech, using the acoustic model and the correspondence data read into the main storage, wherein the dictionary data contains at least one beginning part dictionary storing data representing a plurality of beginning parts of words, and a group of ending part dictionaries storing data representing a group of ending parts corresponding to a group of beginning parts represented by the beginning part dictionary as a plurality of ending part dictionaries, and wherein the dictionary management part reads the word order data and the beginning part dictionary containing beginning parts of a group of words to be candidates of at least one word among the words contained in the inputted speech into the main storage, and at same moment with recognizing an N-th (N is a natural number) word in the inputted speech using the beginning part dictionary, reads the ending part dictionary and/or the beginning part dictionary for an (N+1)-th word in the inputted speech that follows the N-th word being recognized at the moment into the main storage based on the word order data.

2. The speech recognition apparatus according to claim 1, wherein the beginning part dictionary stores beginning parts with respect to a whole group of words to be candidates of a plurality of sequentially associated words to be recognized, and the dictionary management part reads the beginning part dictionary and the ending part dictionary of a group of words to be candidates of a first word among the words contained in the speech before the recognition part starts recognizing the inputted speech, when the recognition part recognizes an N-th (N is a natural number) word, the dictionary management part selects the ending part dictionary containing ending parts of a group of words to be candidates of an (N+1)-th word from the plurality of ending part dictionaries based on the N-th word and the word order data and starts reading, and during the read, the recognition part recognizes a beginning part of the (N+1)-th word, using the beginning part dictionary.

3. The speech recognition apparatus according to claim 1, wherein the dictionary management part reads the ending part dictionary containing ending parts of a group of words to be candidates of a first word among the words contained in the inputted speech, and the beginning part dictionary containing beginning parts of a group of words to be candidates of first and second words before the recognition part starts recognition, when the recognition part recognizes an N-th (N is a natural number) word, the dictionary management part reads the ending part dictionary containing ending parts of a group of words to be candidates of an (N+1)-th word and the beginning part dictionary containing beginning parts of a group of words to be candidates of an (N+2)-th word.

4. The speech recognition apparatus according to claim 1, wherein when the recognition part matches a part of the beginning parts of the words with the speech using the beginning part dictionary read into the main storage, the dictionary management part starts reading the ending part dictionary and/or the beginning part dictionary based on the matching results.

5. The speech recognition apparatus according to claim 1, wherein the word order data is recorded in the ending part dictionary so as to correspond to respective ending parts of words, as dictionary identification data representing the beginning part dictionary containing beginning parts of a group of words having a possibility for following the ending parts of words or the ending part dictionary containing ending parts of the group of words, and the dictionary management part reads the beginning part dictionary or the ending part dictionary based on the dictionary identification data corresponding to the ending part of the word recognized by the recognition part.

6. The speech recognition apparatus according to claim 5, wherein the dictionary data contains a plurality of beginning part dictionaries, and based on the dictionary identification data corresponding to the ending part of the recognized word, the recognition part selects the beginning part dictionary containing beginning parts of a group of words having a possibility for following the recognized word from the plurality of beginning part dictionaries, and recognizes a word following the recognized word, using the selected beginning part dictionary.

7. The speech recognition apparatus according to claim 1, wherein the dictionary management part deletes the ending part dictionary or the beginning part dictionary that becomes unnecessary after being used for recognizing a word by the recognition part, among the ending part dictionary and the beginning part dictionary read into the main storage, from the main storage.

8. The speech recognition apparatus according to claim 1, wherein the dictionary data contains a group of words having a possibility for being contained in a speech under a condition that the words are divided into beginning parts and ending parts in accordance with at least one of a phoneme number, a syllable number, a molar number, a word appearance frequency, and a capacity of a usable memory, and the beginning parts and the ending parts are recorded so as to be contained in the beginning part dictionary and the ending part dictionary respectively.

9. A speech recognition method for causing a computer with a central processing unit to recognize a plurality of sequentially associated words contained in an inputted speech and output recognition results thereof, the method comprising:

an acoustic model reading operation of causing the computer to read an acoustic model previously recorded in an auxiliary storage into a main storage;

a dictionary management operation of causing the computer to read dictionary data that includes a beginning part dictionary representing beginning parts of a group of words to be candidates of a word to be recognized, an ending part dictionary representing ending parts of the group of words, word order data representing a word order and correspondence data representing a correspondence between a beginning part dictionary and an ending part dictionary from the auxiliary storage into the main storage; and a recognition operation of causing the computer to successively recognize the plurality of sequentially associated words contained in the inputted speech by matching a group of words represented by the beginning part dictionary and the ending part dictionary read into the main storage with the inputted speech, using the acoustic model and the correspondence data read into the main storage, wherein the dictionary data contains at least one beginning part dictionary storing data representing beginning parts of a plurality of words, and a group of ending part dictionaries storing data representing a group of ending parts corresponding to a group of beginning parts represented by the beginning part dictionary as a plurality of ending part dictionaries, and wherein in the dictionary management operation, the computer reads the word order data and the beginning part dictionary containing beginning parts of a group of words to be candidates of at least one word among the words contained in the inputted speech into the main storage, and at same moment with recognizing an N-th (N is a natural number) word in the inputted speech using the beginning part dictionary, reads the ending part dictionary and/or the beginning part dictionary for an (N+1)-th word in the inputted speech that follows the N-th word being recognized at the moment into the main storage based on the word order data.

10. A recording medium storing a speech recognition program for causing a computer to execute processing of recognizing a plurality of sequentially associated words contained in an inputted speech and outputting recognition results thereof, the speech recognition program causing the computer to execute:

acoustic model reading processing of reading an acoustic model previously recorded in an auxiliary storage into a main storage;

dictionary management processing of reading dictionary data that includes a beginning part dictionary representing beginning parts of a group of words to be candidates of a word to be recognized, an ending part dictionary representing ending parts of the group of words, word order data representing a word order and correspondence data representing a correspondence between a beginning part dictionary and an ending part dictionary from the auxiliary storage into the main storage; and recognition processing of successively recognizing the plurality of sequentially associated words contained in the inputted speech by matching a group of words represented by the beginning part dictionary and the ending part dictionary read into the main storage with the inputted speech, using the acoustic model and the correspondence data read into the main storage, wherein the dictionary data contains at least one beginning part dictionary storing data representing beginning parts of a plurality of words, and a group of ending part dictionaries storing data representing a group of ending parts corresponding to a group of beginning parts represented by the beginning part dictionary as a plurality of ending part dictionaries, and wherein in the dictionary management processing, the program causes the computer to read the word order data and the beginning part dictionary containing beginning parts of a group of words to be candidates of at least one word among the words contained in the inputted speech into the main storage, and at same moment with recognizing an N-th (N is a natural number) word in the inputted speech using the beginning part dictionary, read the ending part dictionary and/or the beginning part dictionary for an (N+1)-th word in the inputted speech that follows the N-th word being recognized at the moment into the main storage based on the word order data.

* * * * *